United States Patent [19]

Vaudreuil

[11] Patent Number: 5,740,230
[45] Date of Patent: Apr. 14, 1998

[54] DIRECTORY MANAGEMENT SYSTEM AND METHOD

[75] Inventor: Gregory M. Vaudreuil, Dallas, Tex.

[73] Assignee: Octel Communications Corporation, Milpitas, Calif.

[21] Appl. No.: 657,775

[22] Filed: May 31, 1996

[51] Int. Cl.⁶ .......................... H04L 12/58; G06F 15/163
[52] U.S. Cl. ...................... 379/88; 379/93.14; 379/93.24; 395/200.36; 395/200.75
[58] Field of Search .................... 379/67, 88, 89, 379/93.14, 93.15, 93.24, 100.08, 100.13, 207, 220; 370/392, 400, 401, 407, 428; 340/825.3, 825.31, 825.34, 825.52; 395/200.34, 200.36, 200.68, 200.74, 200.75, 200.79, 200.82

[56] References Cited

U.S. PATENT DOCUMENTS

| | | | |
|---|---|---|---|
| 4,661,974 | 4/1987 | Bales et al. | 379/198 |
| 4,734,931 | 3/1988 | Bourg et al. | 379/93.01 |
| 4,790,003 | 12/1988 | Kepley et al. | 379/88 |
| 4,797,672 | 1/1989 | Kousa | 340/825.3 |
| 4,807,274 | 2/1989 | Kousa | 379/6 |
| 4,837,798 | 6/1989 | Cohen et al. | 379/88 |
| 4,879,743 | 11/1989 | Burke et al. | 379/142 |
| 4,932,042 | 6/1990 | Baral et al. | 379/67 |
| 4,939,771 | 7/1990 | Brown et al. | 379/67 |
| 4,996,704 | 2/1991 | Brunson | 379/67 |
| 4,996,707 | 2/1991 | O'Malley et al. | 379/100.13 |
| 5,113,430 | 5/1992 | Richardson, Jr. et al. | 379/88 |
| 5,131,020 | 7/1992 | Liebesny et al. | 379/209 X |
| 5,187,735 | 2/1993 | Herrero Garcia et al. | 379/88 |
| 5,193,110 | 3/1993 | Jones et al. | 379/93.14 |
| 5,331,634 | 7/1994 | Fischer | 370/405 |
| 5,333,266 | 7/1994 | Boaz et al. | 395/200.36 |
| 5,339,356 | 8/1994 | Ishii | 379/234 |
| 5,363,369 | 11/1994 | Hemmady et al. | 370/392 |
| 5,406,557 | 4/1995 | Baudoin | 370/407 |
| 5,459,717 | 10/1995 | Mullan et al. | 379/220 X |
| 5,493,564 | 2/1996 | Mullan | 379/220 X |

FOREIGN PATENT DOCUMENTS

9424803  10/1994  WIPO .

OTHER PUBLICATIONS

"Message Transport & Routing Service (MTRS), Technical Service & Architecture Description Special Report, (SR–INS–002662 Issue 1)", *MTRS Industry Forum*, Bellcore, Jul. 1, 1993.

"Message Transport & Routing Service (MTRS), Technical Service and Architecture Description Special Report, (SR–INS–002662 Issue 1)", *MTRS Technical Service and Architecture Description*, Bellcore, May 1993.

(List continued on next page.)

*Primary Examiner*—Thomas W. Brown
*Attorney, Agent, or Firm*—Baker & Botts, L.L.P.

[57] ABSTRACT

Communications system (200) comprising a receiving messaging system (202 or 215) connectable to a sending messaging system (210). The receiving messaging system (202 or 215) is operable to receive a message addressed to a recipient and a time stamp of a sending system directory entry associated with the recipient from the sending messaging system (210). The sending system directory entry is used by the sending messaging system (210) for a recipient confirmation. Recipient confirmation may be spoken name confirmation. The receiving messaging system (202 or 215) includes a time stamp of a receiving system directory entry associated with the recipient. The receiving messaging system (202 or 215) validates the recipient confirmation by comparing the time stamp of the receiving system directory entry to the time stamp of the sending system directory entry. Messages with an invalid recipient confirmation may be returned to the sending messaging system (210). Messages with a valid recipient confirmation may be delivered to the recipient. Messages with a valid recipient confirmation may be delivered to one or more network hubs (202) along the way to the recipient.

41 Claims, 11 Drawing Sheets

OTHER PUBLICATIONS

"Message Transport and Routing Service (MTRS), Voice Messaging and Beyond", by Angela Liu, Bellcore.

Hunse, Tom Sheridan, "Voice Mail Service Bureaus—Not Just Mailboxes Anymore", *Voice Processing Magazine*, Mar. 1993, pp. 30–34.

Company Profile on Voice Technologies Group, including a description of voice messaging products (undated).

Various Articles and Documents relating to Envoy Global, Inc. and their voice messaging product, the Apogee 2000 (marked as Exhibits A—N), (Undated).

Boudette, Neal, "IBM Plans 'Smart' Messaging Service", *PC Week*, vol. 10, No. 50, Dec. 20, 1993, pp. 1, 16–17.

Smalley, Eric, et al., "AT&T to unveil On–Line Service Feating Intelligent Agents", *PC Week*, vol. 10, No. 49, Dec. 13, 1993, p. 1, 10–11.

"AT&T Bodylink Services Announces Support for Microsoft AT Work Architecture and Software for Personal Communicators", *Business Wire*, Jun. 9, 1993, pp. 3–4.

Wexler, Joanie, "AT&T Builds Multimedia Mailboxes", *Network World*, Jan. 17, 1994, pp. 19, 21.

Flynn, Laurie, "Apple Adds New Front in Fierce On–Line War", *San Jose Mercury News, Business Monday*, Jan. 8, 1994, pp. 1E, 4E.

Johnson, Bradley, "(Th)e World According to Apple, On–line Interactive Service Lures Rivals, to Absorb AppleLink", *Advertising Age*. (Undated).

"vCard, The Electronic Business Card," Version 2.0, a *versit* Consortium Specification, Apr. 29, 1996.

"Hypertext Transfer Protocol," HTTP/1.0, Network Working Group, May 1996.

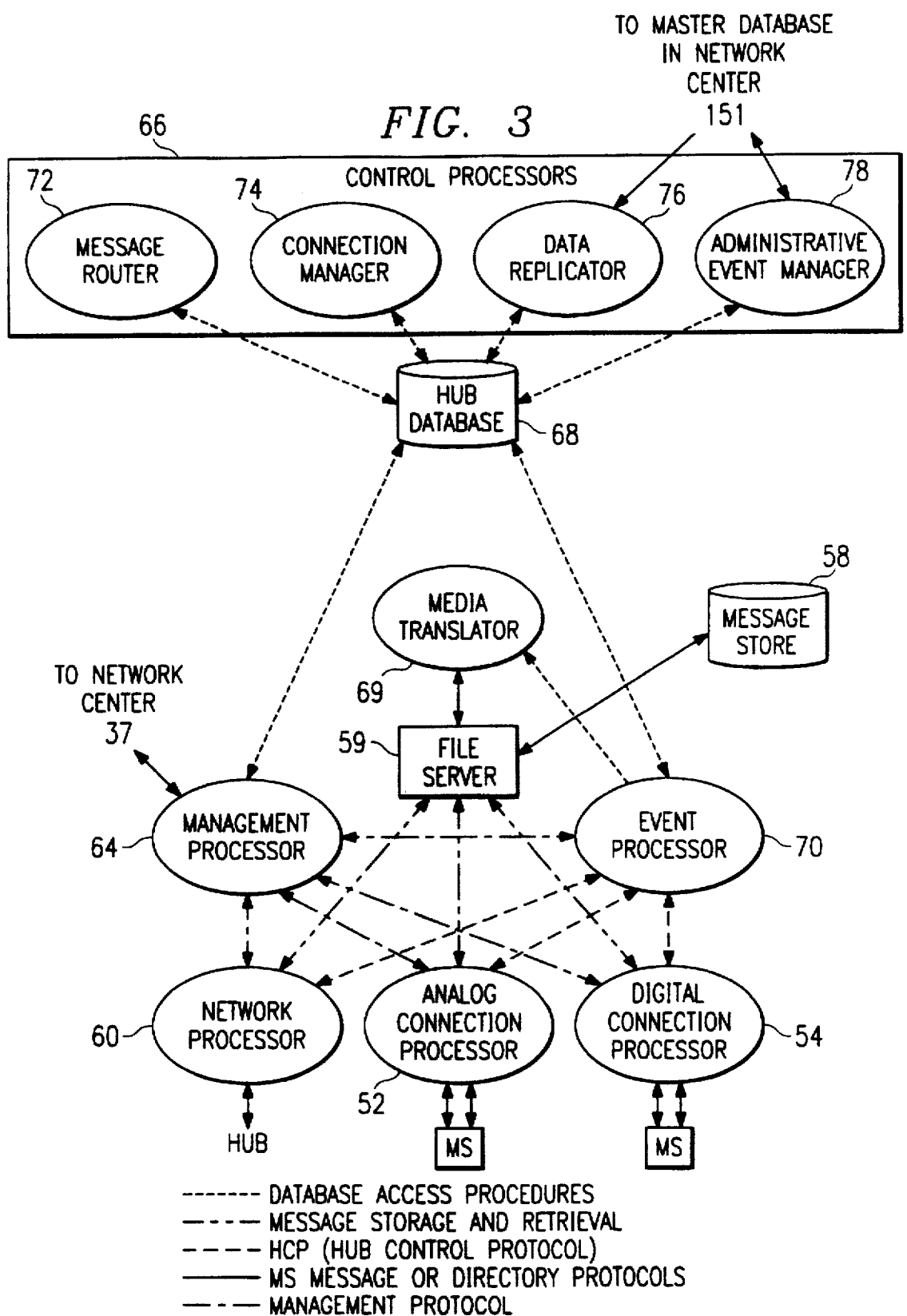

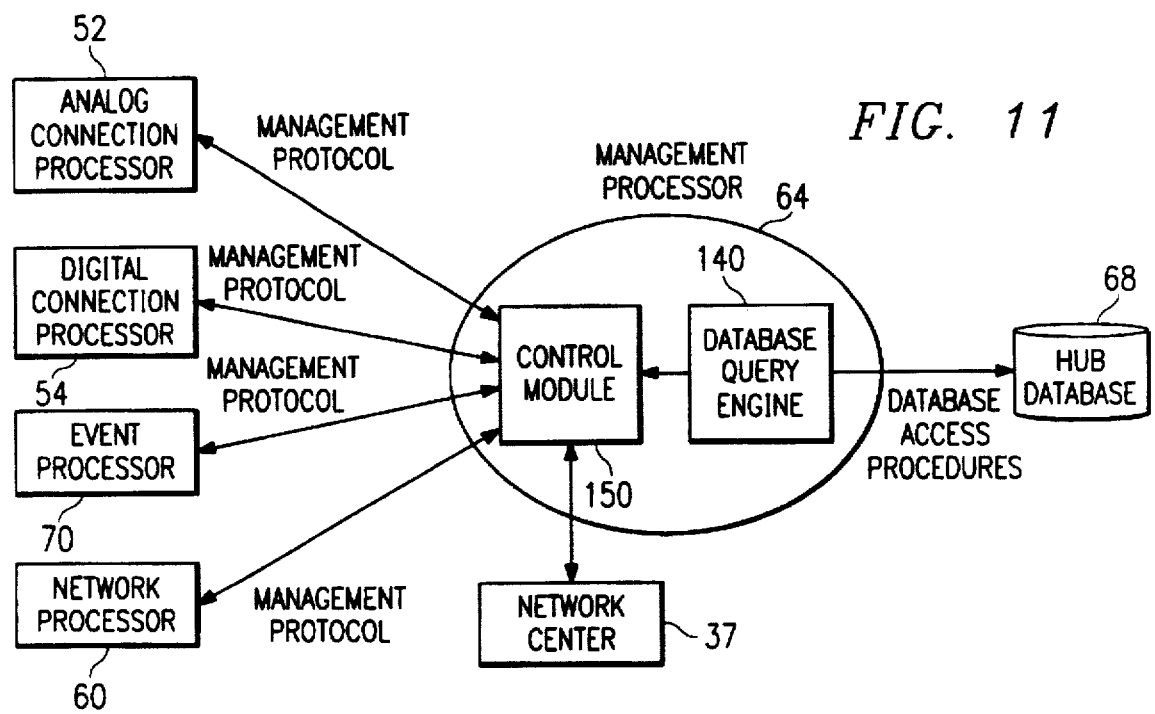
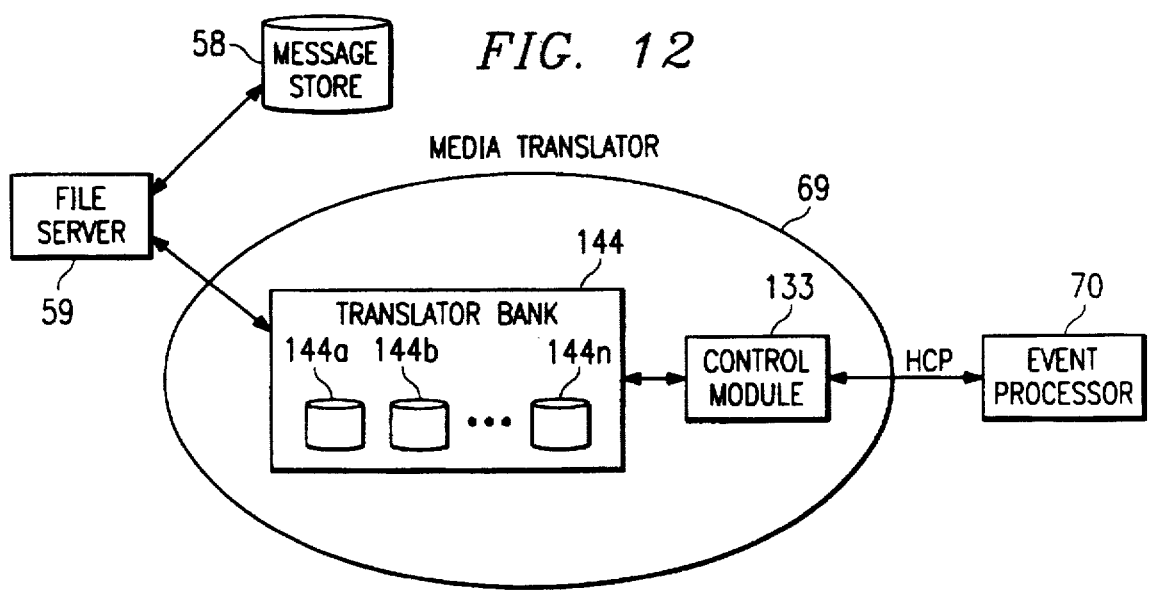

FIG. 14

DESTINATION ADDRESS ⇒ 214-555-2722
MESSAGE MEDIA ⇒ VOICE
SOURCE ADDRESS ⇒ 4437
SOURCE MESSAGING SYSTEM ⇒ CASJO1

INBOUND NETWORK HUB TABLE

|  | ARNIE | ARNIE | GREG |
|---|---|---|---|
| ADDRESS | 4437 | 408-555-4437 | 214-555-2722 |
| MS | CASJO1 | CASJO1 | TXDL03 |
| USER ID | 3 | 3 | 1 |
| COMMUNITY | 0 | 0 | 0 |
| MEDIA | VOICE | VOICE | VOICE, FAX |
| SCOPE | LOCAL | GLOBAL | LOCAL, GLOBAL |
| FEATURES | ALL | ALL | ALL |
| SUBJECT MATTER | ALL | ALL | ALL |

SOURCE USER ID ⇒ 3
COMMUNITY ⇒ 0
DESTINATION USER ID ⇒ 1
DESTINATION MESSAGING SYSTEM ⇒ TXDL03

OUTBOUND NETWORK HUB TABLE

|  | ARNIE | ARNIE | GREG |
|---|---|---|---|
| ADDRESS | 4437 | 408-555-4437 | 214-555-2722 |
| MS | CASJO1 | CASJO1 | TXDL03 |
| USER ID | 3 | 3 | 1 |
| COMMUNITY | 0 | 0 | 0 |
| MEDIA | VOICE | VOICE | VOICE, FAX |
| SCOPE | LOCAL | GLOBAL | LOCAL, GLOBAL |
| FEATURES | ALL | ALL | ALL |
| SUBJECT MATTER | ALL | ALL | ALL |

DESTINATION ADDRESS ⇒ 214-555-2722
SOURCE ADDRESS ⇒ 408-555-4437

| ADDRESS | USER | SENDING SYSTEM DIRECTORY UPDATE TIME |
|---|---|---|
| 1 214 555 7494 | BILL | 9/15/95 |
| 1 214 555 7465 | BRENT | 11/1/95 |
| 1 214 555 2710 | CARL | 9/1/95 |
| 1 214 555 7474 | SUE | 11/1/95 |

| ADDRESS | USER | HUB DIRECTORY MBX CREATE TIME | HUB DIRECTORY UPDATE TIME |
|---|---|---|---|
| 1 214 555 7494 | BILL | 9/1/95 | 12/1/95 |
| 1 214 555 2710 | CARL | 6/1/88 | 12/1/95 |
| 1 214 555 7465 | BRENT | 8/1/93 | 11/1/95 |

| MAILBOX | USER | RECEIVING SYSTEM MBX CREATE TIME | RECEIVING SYSTEM DIRECTORY UPDATE TIME |
|---|---|---|---|
| 1 214 555 7465 | NEWBIE | 1/12/96 | 1/12/96 |
| 1 214 555 2710 | CARL | 6/1/88 | 12/1/95 |
| 1 214 555 2738 | KRIS | 7/1/95 | 9/1/95 |

DIRECTORY MANAGEMENT SYSTEM AND METHOD

TECHNICAL FIELD OF THE INVENTION

This invention relates in general to the field of communications and information management systems and more particularly to an improved directory management system and method for a network-based voice messaging and multimedia communications system.

BACKGROUND OF THE INVENTION

Spoken name confirmation and spell or address by name features have come into widespread use in the voicemail community. Spoken name confirmation of a dialed address provides a necessary degree of confidence that an address has not been mis-dialed and that the message is actually destined to whom it was intended. Spell or address by name provides a limited white pages directory whereby a subscriber can dial numbers on the telephone keypad corresponding to the text name of the recipient.

Traditional store-and-forward networking such as analog voice messaging protocols, provide no direct access to the spoken name confirmation and dial-by-name information of the recipient. To provide this service, a copy of the spoken and text name of the subscriber is stored on the sender's system. These names are collected and stored for a limited period of time in a cache directory.

Voice messaging traditionally uses extension numbers and telephone numbers to identify recipients. Because these numbers are scarce, they are typically reassigned and returned to service quickly after the previous owner relinquished their use. This rapid reuse dramatically increases the likelihood that a mailbox will be reassigned before a sender's directory ages out. This is not a problem with textual addressing such as used in electronic mail because addresses are generally based on recipient last names and it is relatively less common for two persons in a corporation to have the same text name and hence reassign a relinquished address to another.

Accordingly, a need has arisen for an integrated communications system which supplies network-based voice and multimedia communication facilities, and further provides improved directory management.

SUMMARY OF THE INVENTION

In accordance with the teachings of the present invention, a communications system is disclosed which substantially eliminates or reduces disadvantages associated with prior systems and solutions.

In accordance with one aspect of the present invention, a communications system is provided that includes a receiving messaging system connectable to a sending messaging system. The receiving messaging system may receive a message addressed to a recipient and a time stamp of a sending system directory entry associated with the recipient from the sending messaging system. The sending system directory entry may be used by the sending messaging system for a recipient confirmation. The receiving messaging system may include a time stamp of a receiving system directory entry associated with the recipient. The receiving messaging system may validate the recipient confirmation by comparing the time stamp of the receiving system directory entry to the time stamp of the sending system directory entry.

In one embodiment, the time stamp of the sending system directory entry may be an update time stamp. The receiving system directory entry may include an update time stamp and a creation time stamp. The receiving messaging system may validate the recipient confirmation of the sending messaging system by comparing the creation time stamp of the receiving system directory entry to the update time stamp of the sending system directory entry. The receiving messaging system may also determine an update status of the sending system directory entry by comparing the update time stamp of the receiving system directory entry to the update time stamp of the sending system directory entry.

The communications system may return messages having an invalid recipient confirmation to the sending messaging system. The communications system may deliver messages having a valid recipient confirmation to the recipient. Messages with a valid recipient confirmation may be delivered to one or more network hubs along the way to the recipient. Additionally, sending system directory entries used by the sending messaging system for an invalid recipient confirmation may be deleted.

In accordance with another aspect of the present invention, a network hub may be connectable to a sending messaging system. The network hub may receive from a sending messaging system a message addressed to a recipient, a reply address of a sender of the message, a time stamp of the message, and a time stamp of a sending system directory entry associated with the recipient. The sending system directory entry may be used by the sending messaging system for a recipient confirmation. The network hub may include a time stamp of a hub directory entry associated with the recipient. The network hub may validate the recipient confirmation by comparing the time stamp of the hub directory entry to the time stamp of the sending system directory entry. Messages having a valid recipient confirmation may be delivered to a receiving messaging system along with the reply address of the sender of the message and the time stamp of the message.

In response to the message, the network hub may receive a reply addressed to the reply address of the sender and the time stamp of the message. The network hub may include a time stamp of a hub directory entry associated with the sender. The network hub may validate the reply address of the sender by comparing the time stamp of the hub directory entry associated with the sender to the time stamp of the message. A reply having an invalid reply address may be returned to the messaging system from which it was sent. A reply having a valid reply address may be delivered to the sender. Replies with a valid reply address may be delivered to one or more network hubs along the way to the sender.

Important technical advantages of the present invention include providing an improved directory management system and method for a communications system. Another important technical advantage of the present invention includes providing a receiving messaging system that validates a recipient confirmation given by a sending messaging system. Such confirmation may be spoken name confirmation. In particular, the receiving messaging system validates a recipient confirmation by comparing the time stamp of the receiving system directory entry to the time stamp of the sending system directory entry. Messages having an invalid recipient confirmation may be returned while those having a valid recipient confirmation may be delivered.

Still another important technical advantage of the present invention includes providing validation for reply messaging. Accordingly, a recipient of a message may reply at any time to the message without fear that the sender's mailbox has been reassigned and thus the reply will be mis-delivered.

Other technical advantages will be readily apparent to one skilled in the art from the following figures, descriptions, and claims.

BRIEF DESCRIPTION OF THE DRAWINGS

A more complete understanding of teachings of the present invention may be acquired by referring to the accompanying drawings in which like reference numbers indicate like features and wherein:

FIG. 3 is a data flow diagram illustrating the flow of messages and control information between the software modules used in the network hubs of the present invention;

FIG. 11 is a block diagram of the management processor used in the communications system of the present invention;

FIG. 12 is a data flow diagram of the media translator used in the communications system of the present invention;

FIG. 14 is an example of the address translation operation of the communications system of the present invention;

FIG. 16 is an illustration of directories used by the present invention; and

DETAILED DESCRIPTION OF THE INVENTION

Network Structure

Figure 1:
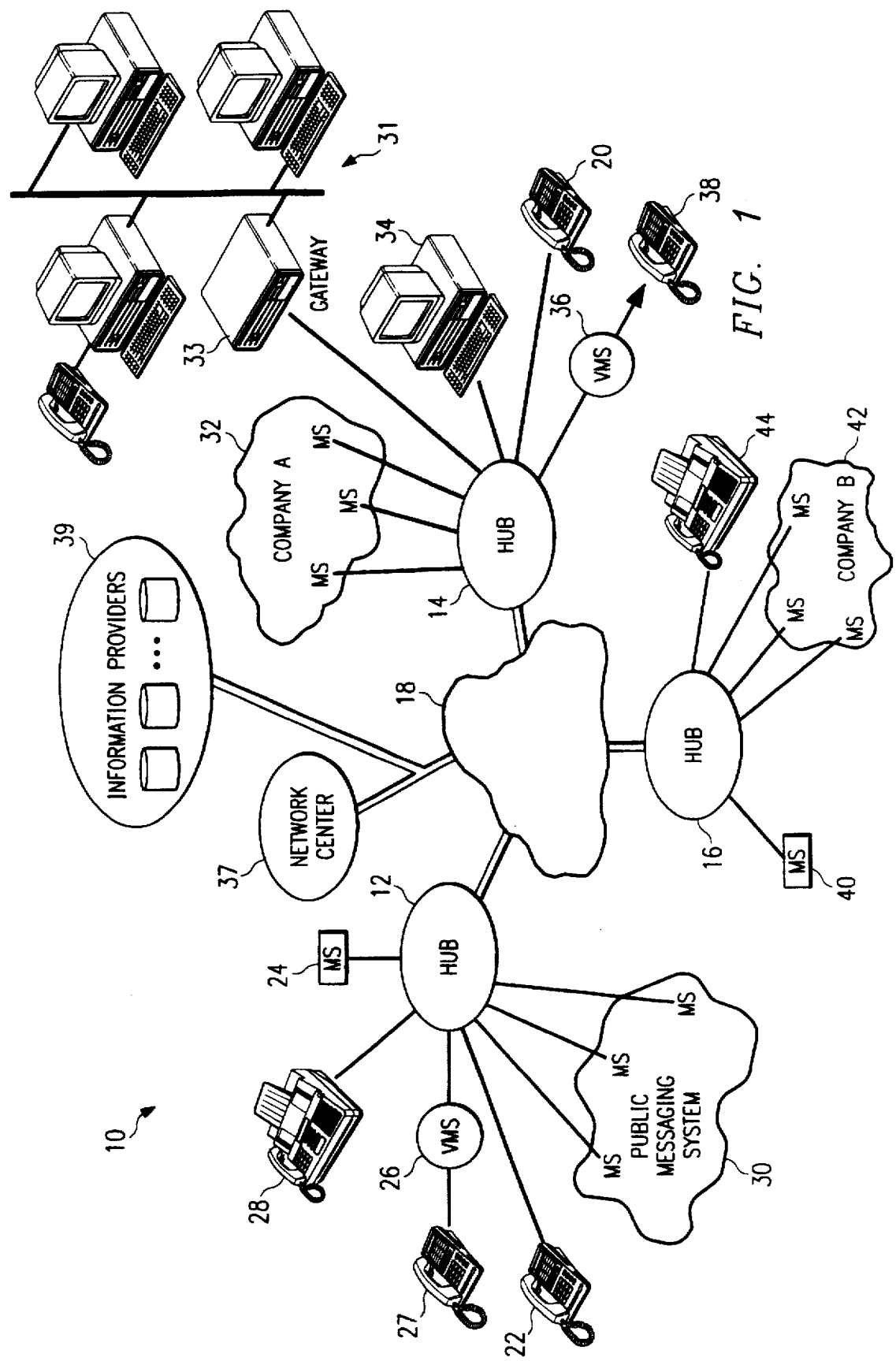
FIG. 1 is a block diagram of the multimedia communications system of the present invention.

FIG. 1 is a block diagram of a multimedia network-based communications system, indicated generally at 10, comprising a number of network hubs 12, 14 and 16. Network hubs 12, 14 and 16 are coupled to one another through a communications network 18 that may comprise, for example, high speed datalinks, frame relay links or other suitable high speed data communication facilities. Communications system 10 operates to process and route communications traffic from a wide variety of message sources and to a wide variety of message destinations. For example, hub system 12 is shown coupled to a telephone 22, a messaging system 24, a conventional voice mail system 26 which is coupled to a large number of telephone terminals represented by telephone 38, a facsimile transmission system 28 and a public messaging network 30. Public messaging system 30 may comprise, for example, messaging services provided to the public by local exchange carrier. In addition, network hub 14 is shown coupled to a private system 32 that itself contains a number of messaging systems and to an electronic mail facility 34. Network hub 14 is also shown coupled directly to a telephone 20 and to a conventional voice mail system 36 which is coupled to a large number of telephone terminals represented by telephone 38. It should be understood that telecommunications connections that are shown as direct connections may actually include intermediate switching facilities such as private branch exchanges or central office switches that are part of private and public telecommunications networks.

Network hub 14 is also shown coupled to a private local area network, indicated generally at 31, which communicates with network hub 14 using a communications gateway 33. Local area network 31 may be used to support a wide variety of messaging operations and may connect user stations having electronic mail capability, facsimile capability, voice capability or video capability. The communications system 10 may be used to connect all these systems with other messaging systems through gateway 33 and network hub 14.

Similarly, network hub 16 is shown coupled to a messaging system 40, a private system 42 comprising a number of messaging systems, and a facsimile transmission and receive facility 44. The network hub systems 12, 14 and 16 are also coupled through the communications network 18 to a network center 37. The network center 37 monitors the operation of the network 10 as will be discussed more fully herein. Information providers 39 are also provided a gateway into the communications system 10 for data and message traffic from information providers 39. Information providers 39 may provide, for example, bulletin board information or mass distributed information services or advertising messages that are distributed to users of the communications system 10 based on the preferences or demographics of the users and the content of the information.

As will be discussed more completely herein, communications system 10 operates to integrate and interconnect disparate sources and technologies of communication traffic and to translate messages between them. The communications system 10 maintains a universal database of all users of the communications system and their individual communications profiles including the various media in which the users can send and receive messages. For example, a single user may control and receive communications using an electronic mail facility, a voice mail facility, a facsimile facility and a video facility. All of these facilities are identified in a user profile record associated with that user within the network database associated with system 10. As will be discussed herein, a copy of that database is maintained in each network hub within system 10 exemplified by network hubs 12, 14 and 16 in FIG. 1. For large scale integrated network functionality, interfacing with voice messaging systems introduces further complications for maintaining individual user profiles in that large distributed network directories must be built and maintained based upon numerical addressing and accessed utilizing DTMF signaling and the native protocols of the user system. The communications system 10 further includes media, protocol, and language translation capabilities such that, for example, messages sent in one media can be received in a different media. For example, an electronic mail message might be sent to a destination user that does not have an electronic mail facility but does have a facsimile facility or prefers the receipt of a facsimile transmission over an electronic mail transmission. Accordingly, the communications system 10 will translate the electronic mail message into a facsimile message and deliver the message to the designated facsimile facility. For large scale integrated network functionality, interfacing with voice messaging systems introduces a further complication for the processing of multimedia messages and the alternate routing in that large distributed network directories must be built containing the numerical addresses for the different media destinations and accessed by the numerical addresses of the users of the communications system, and delivered utilizing DTMF signaling and the native protocols of the user system. In addition, the communications protocols associated with voice messaging systems do not have the ability to request and specify special handling for multimedia messages.

For purposes of describing the advantages of the present invention, all the various sources of and destinations for data traffic coupled to and serviced by the communications system 10 are referred to as "messaging systems" whether they comprise voice mail systems, electronic mail systems, facsimile transmission facilities, video transmission facilities or other data transmission or receipt facilities. As such, for purposes of this description, the data received from such a messaging system is referred to herein as a "message" regardless of its composition. For example, a message received, processed and delivered by the communications system 10 may comprise a voice message, an electronic mail message, a facsimile or video transmission or any combination of medium to form a compound message. As used herein, the "media" of a message refers to the manner in which the message is received or delivered. For example, various message media may comprise voice, electronic mail, facsimile or other graphic images, or video. Further, the "protocol" of a message refers to the manner in which the data comprising the message is encoded by the messaging system from which the message originates to the communications system 10, the manner in which the data comprising a message is encoded as it passes through communications system 10, and the manner in which the data comprising a message is encoded prior to its delivery in order for a destination messaging system to comprehend the message. The term "user" will be used herein to refer to human beings interfacing to the communications system 10 either directly or through messaging systems coupled to communications system 10.

The network hubs such as network hubs 12, 14 and 16 shown in FIG. 1 operate as protocol translation facilities to allow for the connection of the communications system 10 to any of a large number of disparate messaging systems employing differing protocols. Currently, there are a great number of communication protocols which are used by private and public telecommunications and data transmission facilities to interconnect messaging systems. The communications system 10 operates to receive messages and administrative information from messaging systems using the protocol native to that system. The messages and administrative information can then be transmitted to the destination facility using the protocol associated with the destination facility. Certain companies maintain proprietary information delivery protocols that can, if such protocols are made available, be supported by the communications system 10. Further, public domain protocols such as X.400 messaging, SS7 signaling and both digital and analog versions of the audio message interchange specification (AMIS) are also supported by communications system 10. For example, the X.400 protocol includes support for virtually all communications features currently in use. A particular feature set is ordinarily dependent on the features used by a particular messaging system and will usually comprise a subset of the features supported by the X.400 protocol. The communications system 10 is flexible enough to support whatever features are implemented by messaging systems connected to the communications system 10. Additionally, for large scale integrated network functionality, interfacing with voice messaging systems introduces a further complication for the providing of multi-protocol translation capabilities in that messages are delivered utilizing DTMF signaling and numerical addresses. In addition, the communications protocols associated with voice messaging systems do not have the ability to request or specify a translation to a disparate protocol.

The communications system of the present invention also works with a variety of public and proprietary protocols for directory information. As will be discussed more fully herein, some messaging systems may only use the communications system of the present invention as a source of addressing and routing information. In these cases, the messaging system provides the communications system 10 with some information about the intended destination. The communications system 10 then returns specific routing information to the messaging system so that the messaging system can independently contact the destination and deliver the message. In these contexts, the directory information passed between the communications system 10 and the messaging system may use any number of public or proprietary directory information protocols understood by the communications system 10. For large scale integrated network functionality, interfacing with voice messaging systems introduces further complications for providing directory addressing services in that large distributed network directories must be built and maintained containing address and delivery information which must be accessed based upon numerical addressing and that this information is delivered to the requesting system utilizing DTMF signaling and the native protocols of the user's messaging system.

In operation, a network hub such as network hub 12 will receive a message through, for example, messaging system 24 shown in FIG. 1. By way of example, suppose messaging system 24 utilizes the analog AMIS protocol form of DTMF signaling. Further, assume that the message from messaging system 24 is intended for a party serviced by private system 42 which utilizes a proprietary digital communication protocol. Accordingly, network hub 12 would receive the message from messaging system 24 in the analog AMIS protocol. Network hub 12 then transforms the information in the message to conform to a network transmission format and transmits the transformed message through the communications network 18 to hub 16. Network hub 16 then uses the proprietary communication protocol understood by private system 42 to transmit the information to private system 42. In this manner, communications system 10 not only acts to translate the media in which the messages are sent to the destination messaging system, but also acts to provide messaging between dissimilar, proprietary messaging systems by supporting disparate communication protocols. The communications system of the present invention uses a shared internal protocol for all routing and processing of messages. As such, the communications system of the present invention can easily be adapted as new communications protocols, such as Multipurpose Internet Mail Extension (MIME) or the like, become popular. The network hubs that are required to interface with systems utilizing these new protocols need only translate the new protocol to the internal protocol. As such, the operation of the communications system as a whole can support the addition of unlimited new protocols.

The network hub systems within communications system 10 are in constant communication with one another and with the network center 37 to provide updates as to the status of messages within the communications system 10 and further updates as to the user profile information stored in the user database in each network hub. The network center 37 receives these database and status updates and transmits those updates to the remaining hubs in the communications system 10. Due to the constant communication between the hubs, these updates provide for a universal directory of user profiles and a constantly changing body of information as to the status of all messages within the communications system 10. For large scale integrated network functionality, interfacing with voice messaging systems introduces further complications for access and update of user profile information and message tracking in that large distributed network directories must be built and accessed by the numerical addresses of the users of the communications system.

As will be discussed herein, the interconnected network hubs within the communications system 10 also provide for a large amount of virtual storage that is available to the messaging systems which are attached to the communications system 10. In this manner, large bulletin boards or other bodies of shared information can be stored on any of the network hubs and be instantaneously available to any messaging system connected to the communications system 10. For large scale integrated network functionality, interfacing with voice messaging systems introduces further complications for providing bulletin boards or other bodies of shared information services in that large distributed network directories must be built and maintained containing numerical address and access/delivery information for the requesting system utilizing DTMF signaling, numerical addressing and directory information and delivered in the native protocols of the user system.

Network Hub Architecture

Figure 2:
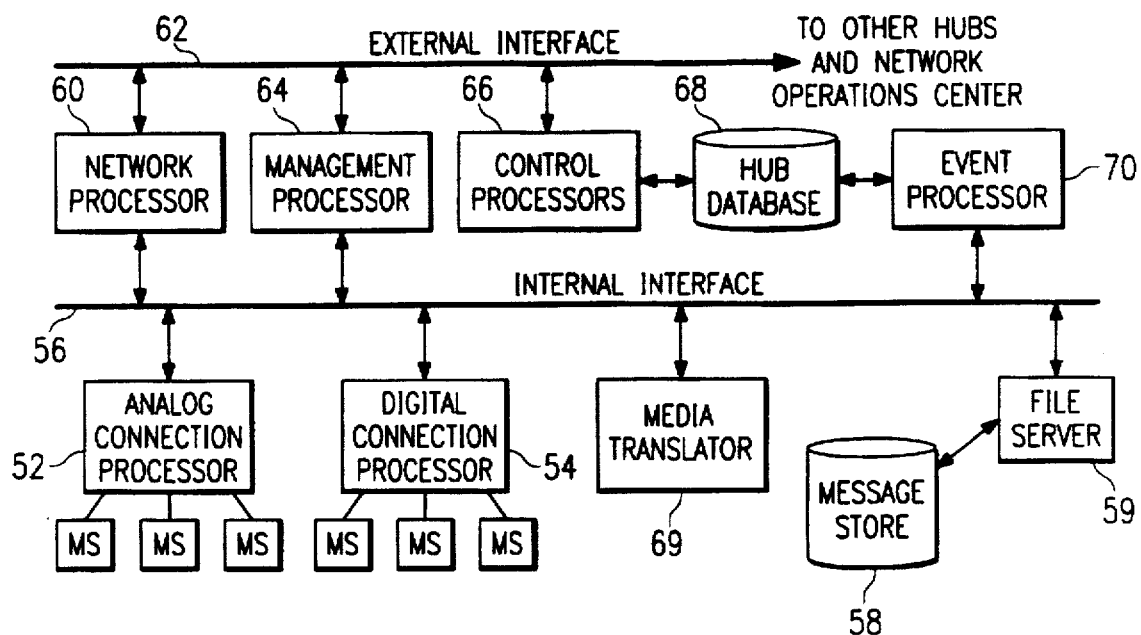
FIG. 2 is a block diagram of the modular software architecture which is used in the network hubs of the present invention.

FIG. 2 is a block diagram of the interrelationship of the various software modules used in the network hubs of the present invention. FIG. 2 illustrates the various modules functioning within a particular network hub such as network hubs 12, 14 and 16 described with reference to FIG. 1 previously. Referring to FIG. 2, connection processors 52 and 54 interact with messaging systems connected to the particular network hub. For example, an analog connection processor 52 communicates with external messaging systems that use analog communication protocols such as an analog communication protocol utilized by a voice messaging system that uses DTMF signaling. Similarly, a digital connection processor 54 communicates with external messaging systems that use digital communication protocols. Although only connection processors 52 and 54 are illustrated in FIG. 2, it should be understood that there are a sufficient number of each of these connection processors for the number of messaging systems coupled to a particular network hub. Connection processors 52 and 54 communicate with the remainder of the software system using, for example, the Transport Control Protocol/Internet Protocol (TCP/IP) through internal interface 56 shown in FIG. 2. Internal interface 56 serves as the main communication link between all of the modules within the software system operating within a particular network hub. Internal interface 56 is also coupled to a file server 59 that provides access to a message store facility 58 which may comprise, for example, a large scale digital storage media such as a hard disk drive. Message store 58 houses the messages received from and to be sent to messaging systems coupled to the network hub. When the media or format of a message must be converted, a media translator 69 is used. Media translator 69 performs media and other forms of translation on messages stored in message store 58. For large scale integrated network functionality, interfacing with voice messaging systems introduces a further complication for providing media and other translation services, in that translation parametrics must be accessed from distributed network directories utilizing numerical addressing methods and that communications protocols associated with voice messaging systems are not able to request or specify media translation services.

A network processor 60 is also coupled to internal interface 56. Network processor 60 is also coupled to a external interface 62 which couples a particular network hub to other network hubs and to the network center 37. Network processor 60 is responsible for collecting and distributing messages to other network hubs. In order to communicate with the other network hubs, the network processor 60 may use, for example, the simple message transport protocol (SMTP) and the MIME protocols.

A management processor 64 is also coupled to both internal interface 56 and external interface 62. Management processor 64 communicates with the network center 37 and the particular network hub and operates to monitor and manage message traffic within the particular network hub. For large scale integrated network functionality, interfacing with voice messaging systems introduces a further complication for tracking of user messages and information, in that messages must be accessed and tracked by the numerical addresses of the users of the voice messaging system.

A group of control processors 66 is coupled between the external interface 62 and a hub database 68. As will be described more completely with reference to FIG. 3, the control processors include a message router 72, a connection manager 74, a data replicator 76 and an administrative event manager 78. In general, the control processors 66 operate to control the operation of the network hub and to manage and manipulate the information stored in the hub database 68. The hub database 68 is also manipulated and coupled to the remainder of the communications system including the internal interface 56 through an event processor 70. The event processor 70 provides the real time control of the network hub components. Event processor 70 responds to directory service requests, identification confirmation requests, analog, digital and network connection requests, message delivery events and administration event queues. For large scale integrated network functionality, interfacing with voice messaging systems introduces further complications for the operations of the control processors, such as message routing, and the operations of the event processor, such as directory service requests, in that large distributed network directories must be built and maintained containing numerical address of the users of the voice messaging system.

Network hubs may be implemented using a variety of hardware platforms depending on the quantity of traffic to be serviced by a particular network hub. In general, the connection processors reside in personal computer platforms serviced by telecommunications peripheral cards. The control processors and database facilities may be implemented on a suitable workstation platform. All of these various discrete hardware platforms may communicate with one another using local area or wide area network systems.

FIG. 3 is a dataflow diagram which illustrates the routing and exchange of various types of data within the various software modules that operate within a network hub. Many of the facilities described with reference to FIG. 2 are shown in more detail in the dataflow diagram of FIG. 3. For example, the control processors 66 are broken out into constituent components. FIG. 3 illustrates the message router 72, the connection manager 74, the data replicator 76 and the administrative event manager 78. As shown in FIG. 3, each of these control processors 66 interacts with the hub database 68 through database access procedures which may comprise, for example, SQL/stored procedures. Essentially, the various software modules may interface with the control processors 66 through communications mechanisms that may comprise, for example, TCP/IP sockets or remote procedure calls.

Event processor 70 interacts with network processor 60, analog connection processor 52, media translator 69, and digital connection processor 54 using a suitable hub control protocol. The hub control protocol may comprise a suitable interprocess communication mechanism that provides client-server, request-response communications. The hub control protocol may be based, for example, on remote procedure calls or TCP/IP sockets. The media translator 69 accesses messages in message store 58 through file server 59 to perform media and format conversions as discussed previously.

Management processor 64 interacts with network processor 60, analog connection processor 52, digital connection processor 54 and event processor 70 using a suitable management protocol which may comprise, for example, SNMP proxy or SNMP sub-agent communications. Network processor 60, analog connection processor 52, and digital connection processor 54 interact with message store 58 through file server 59 through the storage and retrieval of messages that may utilize, for example, MIME. Finally, network processor 60, analog connection processor 52, digital connection processor 54, management processor 64 and data replicator 76 communicate with other network hubs, messaging systems, or the network center 37 using messaging protocols or directory protocols appropriate to the destinations connected to these facilities. For large scale integrated network functionality, interfacing with voice messaging systems introduces a further complication for the network hub operations, in that large distributed network directories must be built and maintained containing numerical addresses of the users of the messaging systems.

Network Hub Storage Facilities

Each network hub comprises two data storage facilities described previously. Each network hub comprises a hub database 68 and a message store 58. As described previously, the message store 58 serves to store inbound and outbound messages and is accessed through a file server 59. The hub database 68 comprises a high performance database for the storage of accounting information, directory service requests, identification confirmations, routing information and queue services information. For large scale integrated network functionality, interfacing with voice messaging systems introduces a further complication for the network hub database in that large distributed network directories must be built and maintained containing numerical addresses of the users of the communications system. As will be discussed herein, the hub database 68 includes a variety of administrative queues including inbound and outbound message queues that do not contain actual messages but contain delivery information for the messages stored in message store 58. Software modules that are distributed in nature will access the message store 58 through file server 59 by use of a network file system or other suitable data transport protocols.

The hub database 68 comprises a high performance database. In order to provide flexibility to the operation of the network hub, access to the hub database 68 is provided by a query requestor. A query responder receives abstracted queries from the various software modules through the network remote procedure calls. These calls are translated and answered by the query responder. By using this architecture, the hub database 68 can be altered by simply changing the query responder.

The analog connection processor 52, the digital connection processor 54 and the network processor 60 access the messages stored in message store 58 using file server 59 as necessary. The messages in message store 58 are also accessed by the media translator 69 through file server 59. The media translator 69 performs the translations of messages from one media to another such as, for example, the translation of an electronic mail message into a voice message using a text to speech system. The operation of media translator 69 will be discussed more fully with reference to FIG. 11.

Analog Connection Processor

Figure 4:
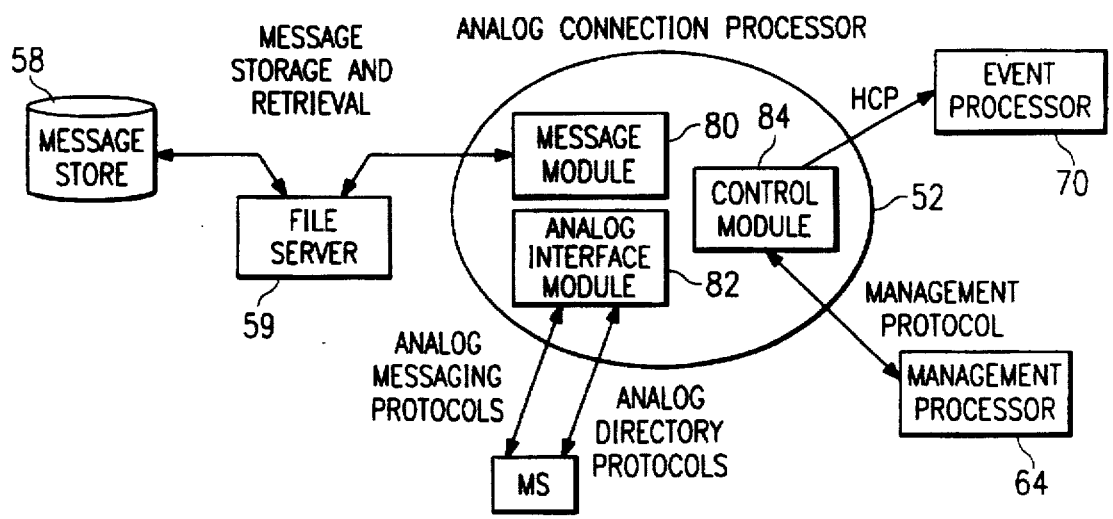
FIG. 4 is a block diagram of an analog connection processor used in the communications system of the present invention.

FIG. 4 is a block diagram of the operation of the analog connection processor 52 discussed with reference to FIGS. 2 and 3 previously. According to one embodiment of the present invention, analog connection processor 52 is responsible for collecting and distributing various forms of messages from analog connected messaging systems using analog networking protocols such as analog AMIS. For large scale integrated network functionality, interfacing with voice messaging systems introduces a further complication to the analog connection processor's functionality, in that the communications system must support standard telephone interfaces, and support numerical addressing and access/deliver information to the requesting system utilizing DTMF signaling, and further support the native protocols of the attached voice messaging system. The analog connection processor 52 runs on a hardware platform that may comprise, for example, a 486-ISA bus personal computer system running the Unix, Windows NT, or SOLARIS operating systems. This hardware platform may contain a plurality of voice, fax, and modem processing cards as well as other forms of interface cards to process other forms of analog data transport. The hardware platform may also contain a high performance network adaptor card such as an Ethernet adaptor for connecting to the remainder of the facilities within a particular network hub. The hardware platform for analog connection processor 52 also comprises disk drive storage for storage of operating system files such as the UNIX operating system plus sufficient temporary storage space to hold incoming and outgoing messages.

Referring to FIG. 4, the analog connection processor 52 is shown to comprise three internal modules. A message module 80 allows the analog connection processor 52 to communicate with the message store 58 described previously through file server 59. An analog interface module 82 provides a communication link between the analog connection processor 52 and messaging systems using analog messaging protocols. A control module 84 allows the analog connection processor 52 to communicate with the management processor 64 using a management protocol. Control module 84 also communicates with event processor 70 as described previously using the hub control protocol.

Figure 5:
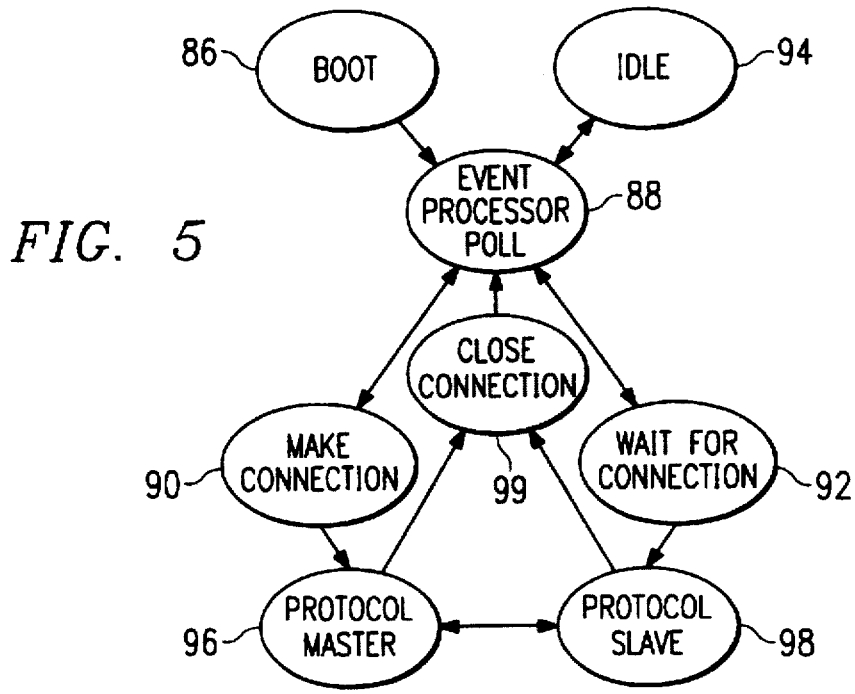
FIG. 5 is a state diagram of the analog connection processor, the digital connection processor and the network processor used in the communications system of the present invention.

FIG. 5 is a state diagram illustrating the operation of analog connection processor 52. Processing begins at a Boot state 86 which is automatically entered upon power-up of the analog connection processor 52 or upon either a hardware or a software reset condition. After the operating system and application software are successfully loaded in the analog connection processor 52, the analog connection processor 52 exits the Boot state 86 and passes to the event processor poll state 88. The event processor poll state is an idle state where the analog connection processor 52 waits for direction from the event processor 70 described previously as to which task the analog connection processor should perform. If while in the event processor poll state 88 the event processor 70 instructs the analog connection processor 52 to create a connection with a messaging system, the analog connection processor 52 leaves state 88 and passes to the make connection state 90 shown in FIG. 5. In state 90, the analog connection processor 52 establishes a connection and confirms that the connection has been made.

The event processor 70 may also direct the analog connection processor 52 while in the event processor poll state 88 to wait for inquiries from messaging systems. If this is the case, the analog connection processor 52 passes to the wait for connection state 92 shown in FIG. 5 where the analog connection processor 52 will remain until a predetermined amount of time has expired or a connection is made with a calling messaging system or network facility. The event processor 70 can also cause the analog connection processor 52 to pass from the event processor poll state 88 to an idle state 94. The idle state 94 is used by the control processors 66 and event processor 70 to hold a communication port in reserve for outgoing calls or otherwise prevent new calls from being received by the analog connection processor 52. In general, a predetermined percentage of the communication ports available to the network hub are maintained in the idle state 54 to provide a pool from which outgoing connections are made in order to deliver messages or directory information. The analog connection processor 52 remains in the idle state 94 until a predetermined amount of time has expired and then the analog connection processor 52 returns to the event processor poll state 88.

After a connection has been completed and authenticated in the make connection state 90, the analog connection processor 52 passes to the protocol master state 96. The protocol master state 96 is the message sending state where messages or directory information are delivered to a messaging system. Once in the protocol master state 96, the analog connection processor 52 continues to deliver all messages and directory information provided by the control processors 66 to the connected messaging system. At certain times during the connection, the analog connection processor 52 offers to pass to a protocol slave state 98, where it may receive messages, directory information, or other data from the messaging system. If no messages, directory information or data need to be received at that time, the analog connection processor 52 passes from the protocol master state 96 to a close connection state 99 where the connection with messaging system is terminated. Processing then returns to the event processor poll state 88.

The protocol slave state 98 is the message receiving state for the analog connection processor 52. When in the protocol slave state 98, the analog connection processor 52 receives and validates messages, directory information and data transmissions from a messaging system. The analog connection processor 52 remains in the protocol slave state 98 until no more messages, directory information, or other data are provided by the messaging system. At that time, the analog connection processor 52 returns to the event processor poll state 88 through the close connection state 99 described previously.

Digital Connection Processor

Figure 6:
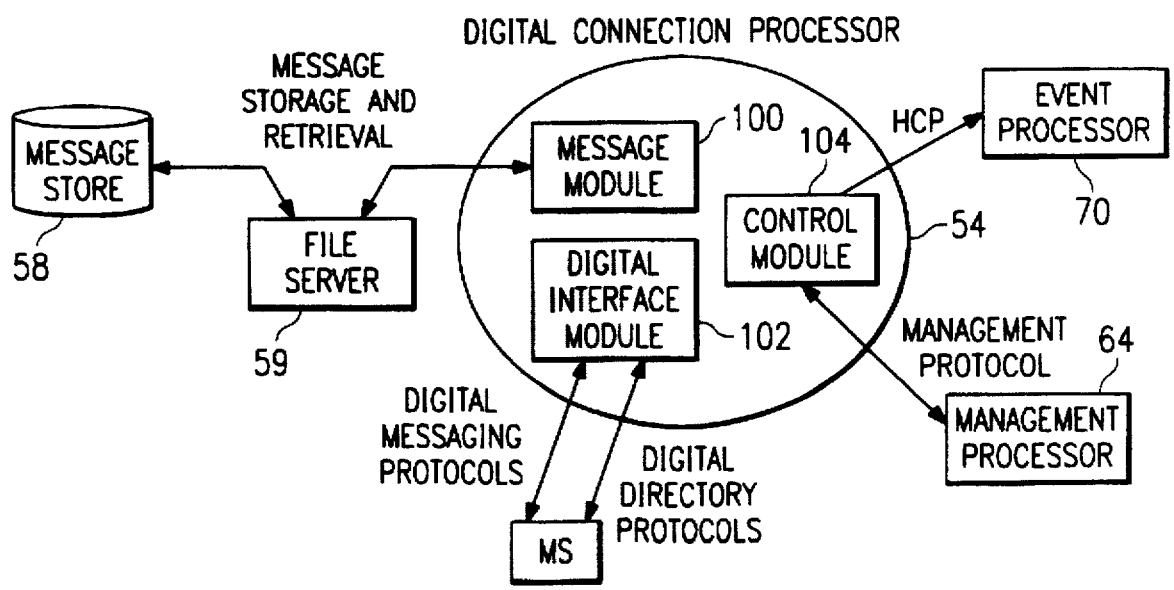
FIG. 6 is a block diagram of the digital connection processor used in the communications system of the present invention.

The digital connection processor 54 operates similarly to the analog connection processor 52 previously described. FIG. 6 is a block diagram which illustrates the functional modules contained within digital connection processor 54. Digital connection processor 54 comprises a message module 100 which facilitates communication between the digital connection processor 54 and the message store 58 through file server 59. Digital connection processor 54 also contains a digital interface module 102 which facilitates communication between digital connection processor 54 and messaging systems that utilize digital protocols such as digital AMIS, SMTP-MIME, cc: Mail and external service providers such as Internet and MCI MAIL.

Digital connection processor 54 further comprises a control module 104 that facilitates communication using hub control protocol with the event processor 70. The control module 104 also communicates with the management processor 64 using the management protocol.

The digital connection processor 54 is responsible for collecting and distributing voice, fax, E-mail and other media messages from digitally-connected messaging systems using digital network protocols. According to one embodiment of the present invention, the digital connection processor 54 also provides and receives directory update services using digital directory protocols such as X.500 and other digital directory protocols. The digital connection processor 54 may be implemented on a personal computer platform which may comprise, for example, a 486-ISA bus personal computer or SPARC system running the Unix, Windows NT, or SOLARIS operating systems. The digital connection processor 54 platform supports a variety of interface systems such as conventional modems for dial-in directory service and mail submission, and directory information queries and Ethernet connections to provide for wide area network Ethernet connections and local area network connection 50 described previously with reference to FIG. 2. Similar to the analog connection processor 52, the digital connection processor 54 also contains a disk drive facility for storage of an operating system such as the UNIX operating system plus sufficient storage to temporarily hold incoming and outgoing messages.

In operation, the digital connection processor 54 uses the identical states described with reference to FIG. 6 and the operation of the analog connection processor 52.

Message Format

Both the analog connection processor 52 and the digital connection processor 54 are responsible for accepting and validating incoming messages. For large scale integrated network functionality, interfacing with voice messaging systems introduces a further complication to the internal message format in that the communications system must support standard telephone interfaces and support messages that are typically large, spanning several minutes of digitized analog audio signals. The delivery of these messages involve a translation or conversion of the message. For example, the message may need to be translated into a different media. Data transmissions that are received may need to be converted from one format to another. As will be discussed more completely with reference to FIG. 11, these conversions and translations are performed by media translator 69. In part, these functions are accomplished by encapsulating all received message data with a standard message wrapper to form a message for transport and storage within the communications system 10. This wrapper may be based, for example, on MIME encapsulation protocol. Many messages received by the communications system 10 already include a message wrapper. These messages are also converted to the standard internal message format. This format tags and labels each message media within a message with the addressing information provided by the sender. Each message contains a date field which comprises the time the message was sent as provided by the message submission protocol or, in the alternative, as provided by the communications system of the present invention. Each message also contains a "from" field where both the network identification of the message sender and the message sender's messaging system identifier are combined into an Internet style address. Each message also contains a "to" field where the network identification of the intended recipient and the messaging facility of the intended destination facility are combined into an Internet style address. Each message also receives a unique message identification field for use in administrative tracking of messages and other administrative concerns.

Various delivery features which will be discussed herein, such as privacy and urgency are usually not identified in the message itself. Rather the presence of these requirements are sent to the control processors 66 when a received message is placed in a message queue within the hub database 68.

Network Processor Operation

Figure 7:
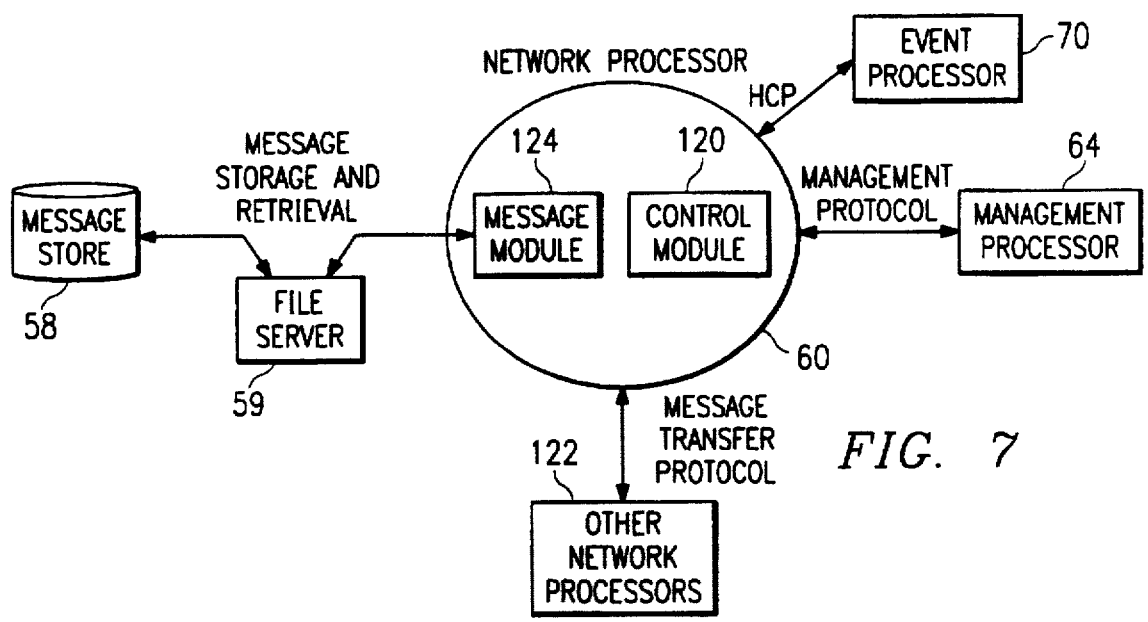
FIG. 7 is a block diagram of the network processor used in the communications system of the present invention.

FIG. 7 is a block diagram which illustrates the functional modules used by the network processor 60. The network processor 60 contains a control module 120 which allows the network processor module to communicate with the event processor 70, the management processor 60, and other network processors 122 shown in FIG. 9. The network processor 60 also includes a message module 124 which facilitates communication with the message store 58 through file server 59. While the network processor 60 can be a stand-alone hardware platform similar to the analog connection processor 52 and the digital connection processor 54, under one embodiment of the present invention, the network processor 60 is implemented as a task on a central server that connects to the internal interface 56 and that contains the remaining storage facilities such as message store 58, file server 59, and hub database 68.

The network processor 60 communicates with other resources in the network hub using three data paths. Control and query information exchanges between the network processor 60 and the event processor 70 are exchanged using the hub control protocol. Operational monitoring statistics and state information are exchanged with the management processor 64 using the management protocol. Messages are passed into and out of message store 58 using file server 59.

The network processor 60 is responsible for collecting and delivering messages to other network hubs within the communications system 10. In operation, the network processor 60 uses the identical states described with reference to FIG. 6 and the operation of the analog connection processor 52. For large scale integrated network functionality, interfacing with voice messaging systems introduces further complications for the network processor operation in that large distributed network directories must be built and maintained containing numerical addresses of the users of the communications system.

Event Processor Operation

Figure 8:
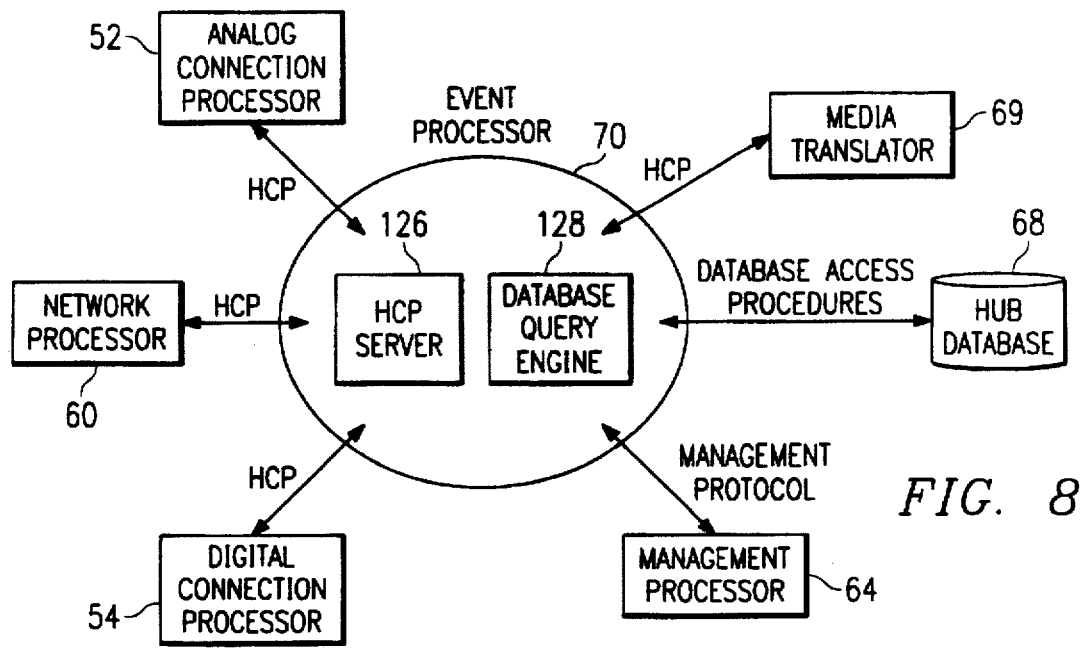
FIG. 8 is a block diagram of the event processor used in the communications system of the present invention.

FIG. 8 is a block diagram which illustrates the functional components of the event processor 70. Event processor 70 comprises a hub control protocol server 126 which receives remote procedure calls from one or more analog connection processors 52, network processors 60 and digital connection processors 54. Event processor 70 also comprises a database query engine 128 which operates to interrogate and manipulate the hub database 68 to service remote procedure calls from one or more analog connection processors 52, network processors 60 and digital connection processors 54. The event processor 70 also interfaces with the management processor 64 using the management protocol. The event processor 70 also interfaces with the media translator 69 to direct the conversion of messages accessed by the media translator 69 from the message store 58 using file server 59. For large scale integrated network functionality, interfacing with voice messaging systems introduces further complications for the event processor operation in that large distributed network directories must be built and maintained containing numerical addresses of the users of the communications system.

Figure 9:
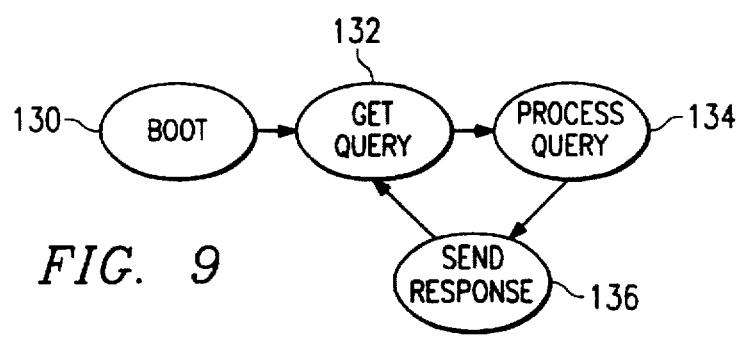
FIG. 9 is a state diagram of the event processor used in the communications system of the present invention.

FIG. 9 is a state diagram illustrating the operation of the event processor 70. Processing within event processor 70 begins in a boot state 130 which is entered upon power-up or reset of the communications system. When the appropriate applications, programs and operating systems are loaded, the operation of event processor 70 passes from boot state 130 to a get query state 132 where the event processor 70 remains waiting for remote procedure calls from analog connection processor 52, network processor 60 or digital connection processor 54, or management protocol queries from management processor 64. Upon receipt of such a query, the event processor 70 passes to a process query state 134 where the database query engine 128 accesses the hub database 68 using database access procedures. The response is received from the hub database 68 in process query state 134 and the event processor 70 passes to a send response state 136 where the appropriate response is forwarded to one of the processors 52, 54, 60, or 64 described previously. The event processor 70 then returns to the get query state 132 where it remains until an additional request is forwarded to the event processor 70.

Control Processor Architecture

Figure 10:
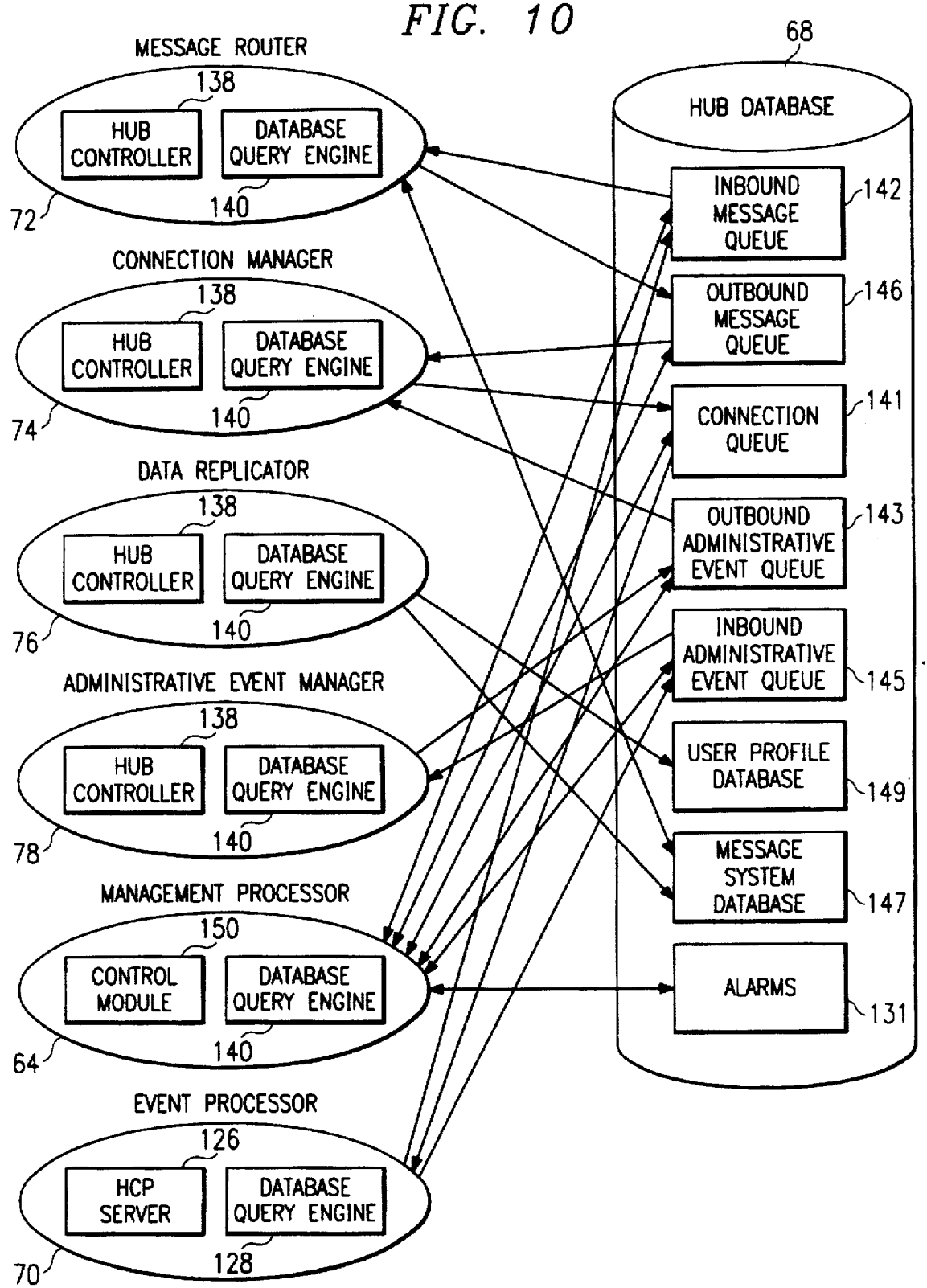
FIG. 10 is a block diagram of the control processors, management processor, event processor, and databases used in the communications system of the present invention.

As shown in FIG. 10, each of the control processors 66 illustrated in FIG. 3 shares a common architecture. The message router 72, the connection manager 74, the data replicator 76, and the administrative event manager 78 each control a collection of tasks responsible for the actions of the network hub. Overall control of the network hub is achieved through control of the hub database 68 and specifically the message queues and administrative event queues contained within the hub database 68. In this manner, control is achieved by prioritizing events stored in the message and administrative event queues and creating and manipulating entries in these queues to be read by the event processor 70. The event processor 70 is the actual real time engine of the network hub.

FIG. 10 is a block diagram which illustrates the architecture of each of the control processors 66, the management processor 64 and the event processor 70, and the manner in which these entities interact with the various portions of the hub database 68. Each of the control processors comprises a hub controller module 138 and a database query engine 140. The hub controller 138 administers the tasks to be stored in the hub database 68 and communicates with the hub database 68 through the database query engine 140 using database access procedures.

Message Router Operation

The message router 72 comprises a hub controller 138 and a database query engine 140. The message router 72 interacts with an inbound message queue 142, an outbound message queue 146, and a message system database 147. In general, the message router 72 uses information from the message system database 147 to determine the next destination for each message passing through the network hub. As discussed previously, the message itself is actually stored in the message store 58 and is accessed using the file server 59. The inbound message queue 142 and the outbound message queue 146 store message records which indicate the location of the message within message store 58 as well as the source and destination of each message. The message router 72 reads message records from inbound message queue 142 after they have been placed there by event processor 70. The message router then determines the next destination for the messages associated with the message record and creates a new message record and places that message in outbound message queue 146.

The message router 72 is also responsible for prioritizing messages and, in the case of future delivery, delaying messages. In general, messages are ranked and delivered in order of priority. Efficient use of the communications system 10 of the present invention requires the ability to shape the messaging traffic into a somewhat constant volume. This traffic shaping is achieved by having the message router 72 selectively delay messages as needed until the network is less loaded. To accomplish this, the message router 72 attaches an internal priority for each message. The internal priority for the communications system is set by both the urgency specified by the submitted messages and how long it has been since the message was received for delivery. For large scale integrated network functionality, interfacing with voice messaging systems introduces a further complication for the message router operation, in that large distributed network directories for the hub database 68 must be built and maintained containing numerical addresses of the users of the communications system.

Connection Manager Operation

The connection manager 74 also contains a hub controller 138 and a database query engine 140. The connection manager 74 reads the message records within outbound message queue 146 and determines the nature of the connection that must be made to service each message record within outbound message queue 146. Connection queue records associated with these connections are formatted and placed in a connection queue 141 within hub database 168. The connection manager 74 also reads administrative event records from an outbound administrative event queue 143 and determines if connections within the network are required to service the administrative event records within outbound administrative event queue 143. If network connections are required, a record is similarly formatted and placed in connection queue 141. For large scale integrated network functionality, interfacing with voice messaging systems introduces further complications for the connection manager operation in that the message records within the inbound and outbound message queues, the administrative event records within the administrative event queue, and the connection queue records within the connection queue must be built, maintained, and accessed using the numerical addresses of the users of the communications system.

The connection manager 74 controls the connections between each network hub, the network center 37, and each messaging system. The connection manager 74 creates connection queue records for each message and administrative event within the outbound message queue 146 and outbound administrative event queue 143 of the hub database 68. The connection manager 74 manages conventional connections and also determines when multiple connections are needed and when failed connections should be retried. The connection manager 74 is triggered by any record within the outbound message queue 146 or the outbound administrative event queue 143. The connection manager 74 may also alternatively engage in periodic scans of all the queues within the network hub to reprioritize the connection queue 141 based on the number of events and the priority of events waiting to occur.

As discussed previously, the connection manager 74 maintains the connection queue 141 which comprises a list of destinations for which a connection needs to be made. These connections may be scheduled for a particular time or as necessary according to a priority based on the number of messages, the oldest message in a particular queue, or the last time the connection was made. The connection queue 141 is accessed by the event processor 70 to determine the next operation for a newly available communication port. The connection queue 141 is periodically updated by the connection manager 74 with a connection priority indication. Each connection queue record is marked with an overall priority indication based on the highest priority message in the connection queue 141 and a count of the number of messages in the connection queue 141.

These priority indications are immediate, High, Normal, or Low. Immediate indicates that one or more events scheduled in the connection queue 141 for a given destination are overdue. High indicates that one or more events scheduled for a given destination have a high internal priority and that a connection to a destination should be made as soon as a connection becomes available. Once a connection is established and the High priority messages are sent, other messages may be sent if the load on the connection permits. The Normal priority indicates that no events scheduled with High priority are resident in the connection queue 141 and at least one Normal priority event is resident in the connection queue 141. The connection manager will open a connection if a connection is free and there are no pending High priority events in the connection queue 141. Once the connection is established and the Normal priority message has been sent, the Low priority events can be processed if load permits. The Low priority indication occurs when only scheduled events of Low priority are resident in the connection queue 141. The connection manager will open a connection is a connection is free and there are no remaining Normal, High, or Immediate priority connections required. The Low priority messages will escalate to a Normal priority if they remain in the connection queue 141 for a predetermined amount of time, for example, two hours.

Efficient operation of the communications system 10 relies on efficient queue management by the connection manager 74. Because a connection processor such as analog connection processor 52, digital connection processor 54 or network processor 60 can change roles on the same connection, the connections between network hubs are prioritized by the total volume of traffic to be exchanged. In addition, in the event that connections are scarce, interacting network hubs attempt to contact each other, increasing the likelihood that a successful connection will be made. In order to facilitate this interaction, a reservation methodology is implemented. When the connection manager 74 creates a connection record within connection queue 141, in addition to adding the delivery information record to the connection queue 141, a similar entry is sent to the remote network hub that is connected to the destination messaging system. In this manner, both the local network hub and the remote network hub know that a connection must be made and contact attempts can be initiated by either network hub. Once a message connection is established, either through the normal processing of the message queues or by the attempts of the network hubs to contact each other, both network hubs can use the connection to deliver all messages to each other.

Administrative Event Manager Operation

The administrative event manager 78 handles administrative events in the same manner that the message router 72 handles message records. Administrative event manager 78 comprises a hub controller 138 and a database query engine 140. Administrative event manager 78 reads entries from the inbound administrative event queue 145 which have been placed there by event processor 70. Administrative event manager 78 then determines if an administrative event message must be sent to another network hub within the communications system 10 or if a message must be sent to the network center 37. If an administrative event message must be sent to any of these locations, an entry is made in the outbound administrative event queue 143. For large scale integrated network functionality, interfacing with voice messaging systems introduces further complications for the administrative event manager operation in that the administrative event records within the administrative event queue must be built, maintained, and accessed using the numerical addresses of the users of the communications system.

Data Replicator Operation

As discussed previously, the data replicator 76 is responsible for the queuing and transport of database change events. The data replicator 76 manages the user information updates for the hub database 68 and processes database change events when they are received from the master database stored in the network center 37. The data replicator 76 insures that the message system database 147 and user profile database 149 within hub database 68 remain synchronized with the master database in the network center 37.

The data replicator 76 also comprises a hub controller 138 and a database query engine 140. The data replicator 76 operates to input new information into a user profile database 149 and the message system database 147. The data replicator 76 receives the updated information from the network center 37 and downloads the information to the user profile database 149 if the information involves new user profile information or downloads the information to the message system database 147 if the new information comprises configuration information for message systems attached to the communications system 10. The data replicator 76 processes information which is transmitted to all network hubs for updates to the user profile database 149 and the message system database 147. In contrast, the administrative event manager 78 accepts updated information from the network center 37 which comprises information which is specific to the particular network hub. In addition, the administrative event manager 78 accepts requests for information from the network center 37 for information which is stored on messaging systems connected to the network hub housing the administrative event manager 78.

Management Processor Operation

Although the architecture of the management processor 64 will be discussed in detail in FIG. 11, its interaction with hub database 68 is shown in FIG. 10. The management processor 64 contains a control module 150 and a database query engine 140. The management processor 64 interacts with an alarms database 131 within hub database 68. The alarms database 131 comprises a list of events that occur within the network hub processing and in some cases the time at which these events occurred. The list of events stored in the alarms database 131 can be used by systems within the network center 37 to track down errors in the processing of messages and to maintain control over when events occur or when events have occurred within the processing of messages within a particular hub.

The management processor 64 also interacts with the inbound message queue 142, the outbound message queue 146, the connection queue 141, the outbound administrative event queue 143, and the inbound administrative event queue 145 as necessary to monitor these queues. The management processor 64 is operable to reorder and delete entries in the queues discussed previously as necessary to repair errors and expedite messages. For large scale integrated network functionality, interfacing with voice messaging systems introduces further complications for the management processor operation in that the accessing, updating, deleting, and reordering of the inbound and outbound message queues, the inbound and outbound administrative event queues, and hub alarm event tables must be performed using the numerical addresses of the users of the communications system.

Event Processor Operation

As discussed previously with reference to FIG. 8, the event processor 70 comprises an HCP server 126 and database query engine 128. The event processor 70 places message records within inbound message queue 142 as they are received into the network hub. Similarly, the event processor 70 places administrative event records into the inbound administrative event queue 145 as they are received into the network hub. The event processor 70 consumes the connection queue 141 as it makes connections to enable the passing of messages out of the particular network hub. For large scale integrated network functionality, interfacing with voice messaging systems introduces further complications for the event processor operation in that inputting message records into the inbound message queue and administrative event records in the inbound administrative event queue, and retrieving records from the connection queue must be performed using the numerical addresses of the users of the communications system.

Management Processor Architecture

FIG. 11 is a block diagram which illustrates the functional components and interactions of the modules comprising the management processor 64. Management processor 64 comprises a control module 150 which interacts using the management protocol with the analog connection processor 52, the digital connection processor 54, the event processor 70 and the network processor 60. The control module 150 also interacts with the hub database 68 and, specifically the alarms database 131, using database access procedures. The management processor 64 acts as the chief liaison between the network hubs and the network center 37. Management processor 64 also receives Customer Service, HelpLine inquiries and directives from the network center 37 using the management protocol. As will be discussed more completely herein, the communications system 10 has the capability of being able to continually track and manage messages within communications system 10. The HelpLine operation allows for messages to be rerouted or terminated after they have been placed in communications system 10 and before they have been delivered. These directives are transmitted to the management processor 64 using the management protocol from the network center 37.

Media Translator

FIG. 12 is a block diagram which illustrates the functional components and interactions of the modules comprising the media translator 69. Referring to FIG. 12, media translator 69 comprises a control module 133 and a translator bank 144. The control module 133 interacts with the event processor 70 using the hub control protocol. The translator bank 144 receives messages from the message store 58 by making requests to file server 59. The translator bank 144 operates to convert the format of data and to translate the media of messages. The messages processed by translator bank 144 are then returned to message store 58 using file server 59. Translator bank 144 comprises a plurality of translators indicated as 144a–n in FIG. 12. Each of the translators 144a–n within translator bank 144 accomplish a stage of the conversion to be performed by translator bank 144. Each translation or conversion is done by first converting the message or data into a high quality internal format that contains sufficient data representation to insure that no data is lost during the conversion process. Translations of messages from one media to another are performed while the message is represented in the internal format. In this manner, the translator bank 144 need only contain a minimum number of media to media translators. In summary, the control module 133 can cause the translator bank 144 to use many different filters in sequence to accomplish any permutation of media-to-media translation, message-to-message transformation or data-to-data conversion.

The communications system of the present invention offers a ubiquitous messaging service which provides for the delivery of messages to messaging systems of various technologies using their native protocols and allows a recipient to select, where practical, the preferred media for receiving messages. In order to offer this facility, the communications system of the present invention is able to communicate with messaging systems using various messaging protocols used by current messaging systems. For large scale integrated network functionality, interfacing with voice messaging systems introduces further complications for the communications system of the present invention, and especially the media translator in that the user profile records must be accessed to perform media translation selection because the communications protocols associated with voice messaging systems are not able to indicate the necessity or to specify the nature of media translation services required.

Each network hub also includes the ability to translate messages into various forms of message media. These media translation features include the ability to translate text to speech, facsimile images to text and text images, text and text images to facsimile images, and speech to text. These media translation capabilities can also be combined for a single message. For example, to the extent that speech is required to be translated into a facsimile image, the data is first translated into text and then into a facsimile image of the text.

As discussed previously, media translation may be accomplished according to the desires of the message recipient. In addition, media translation can occur automatically responsive to the needs of a destination messaging system. For example, if a destination messaging system comprises a simple voice message system with no data, facsimile or capability other than voice, all messages to such voice message system can be translated to voice messages regardless of the media in which the message was sent. In this particular example, the communications system of the present invention would translate all non-voice messages to a textual format and utilize a text to speech converter to create the final, deliverable voice message.

Network Center

Figure 13:
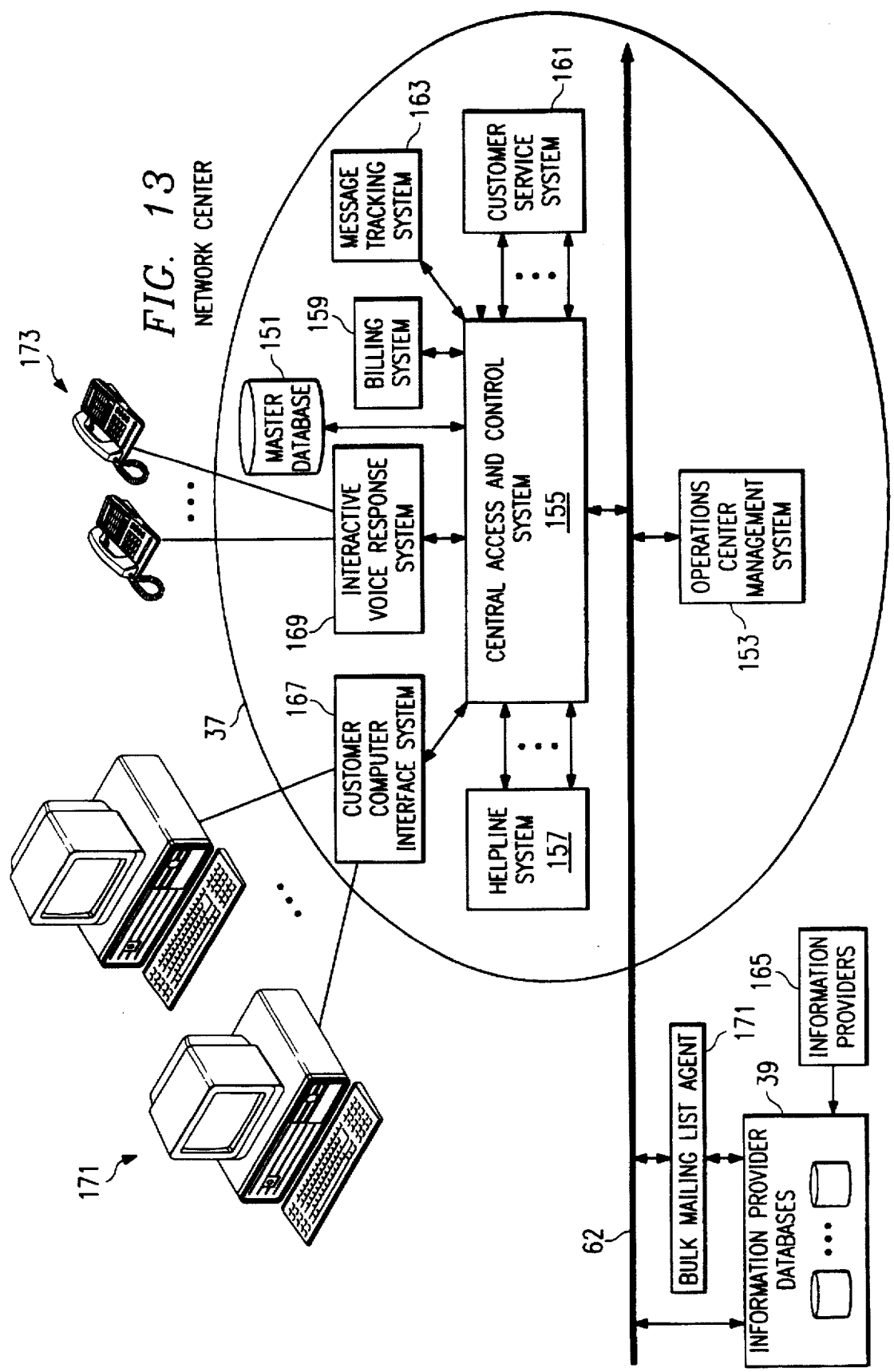
FIG. 13 is a block diagram of the network center used in the communications system of the present invention.

FIG. 13 is a schematic block diagram of the components of the network center 37 used in the communications system of the present invention. The network center 37 communicates with the remainder of the communications system 10 through external interface 62 which is connected to or a part of communications network 18. The network center 37 further comprises an operations center management system 153 and an central access and control system 155 coupled to external interface 62. The central access and control system 155 is coupled to a HelpLine system 157, a customer service system 161, a billing system 159, a message tracking system 163, a customer computer interface system 167, a master database 151, and an interactive voice response system 169.

As discussed previously, master database 151 operates as a central repository for all user information, message system information, and message status information that is used by the network hubs to manage messages within communications system 10.

The central access and control system 155 comprises the interface to the remainder of the communications system for the master database 151, the HelpLine system 157, the billing system 159, the message tracking system 163, the customer service system 161, the customer computer interface system 167 and the interactive voice response system 169. The customer service system 161 supplies information as to additions and changes to the user databases and message system databases. Customer service system 161 can also serve as a gateway for questions requiring the use of the billing system 159. The HelpLine system 157 provides access to the central access and control system 155 for purposes of providing information to the message tracking system 163. In addition, the HelpLine system 157 can create trouble tickets identifying problems within the communications system 10 which are passed by the central access and control system 155 to the operations center management system 153. The trouble tickets are then investigated and corrected by the operations center management system 153.

The customer computer interface system 167 is coupled to a plurality of user terminals indicated generally at 171. Similarly, the interactive voice response system 169 is coupled to a plurality of user touchtone compatible telephones indicated generally at 173 in FIG. 13. The customer computer interface system 167 and the interactive voice response system 169 provide gateways into the central access and control system 155 for users to directly interact with the central access and control system 155. Using the customer computer interface system 167, the users can digitally interface with central access and control system 155 to accomplish the same functions performed by HelpLine system 157, customer service system 161 and message tracking system 163. Similarly, users using touchtone telephones 173 can interact with the central access and control system 155 through interactive voice response system 169 to migrate through various choices presented to the users to accomplish the same functions accomplished by HelpLine system 157, customer service system 161, and message tracking system 163.

For large scale integrated network functionality, interfacing with voice messaging systems introduces further complications for the network center 37. First, the accessing of records in the master database files must be performed using the numerical addresses of the users of the communications system. Secondly, the providing of an interactive voice response capability must be performed using standard telephone equipment using DTMF signaling, addressing must be numerical, voice must be the only media, identification confirmation must be spoken, and directory access/inquiry must be performed using DTF signaling.

FIG. 13 also illustrates that information provider databases 39 are also coupled to external interface 62 either directly or through a bulk mailing list agent 171. The information provider databases 39 are accessed and updated by information providers 165 shown in FIG. 13. As will be discussed more completely herein, the information providers 165 can supply information for the information provider databases 39 that can be accessed by users of the communications system 10. This information may comprise, for example, advertising messages or other information associated with products or services provided by the information providers 165.

User Profiles and Address Translation Operation

The communications system of the present invention contains a directory with which it offers a range of addressing and directory services. A copy of the directory is stored in each of the network hubs and includes the network identification of a number of addresses associated with each user. The directory further includes the routing information and feature parameters associated with each user as well as identification confirmations which may comprise, for example, name records for spelled and spoken name confirmation and graphic or video images of each user for visual recognition.

Internally, the communications system of the present invention uses a globally unique number to route and deliver messages which will be referred to as the user ID. The communications system of the present invention supports multiple numbers and non-numeric addresses for each identified network user. This facilitates support for a single user mailbox to be coupled to multiple phone numbers, facsimile numbers, voice mail system numbers, E-mail identifiers, external network addresses and the like. The external addresses associated with each of these facilities may comprise arbitrary character strings with arbitrary internal structure. Because of the directory system used by the communications system of the present invention, external addresses need not be globally unique. The internal directory specifies what type of messages are to be routed to each destination associated with a particular user. Using its internal directory, the communications system of the present invention transparently converts between any address type including proprietary voice mail system addressing, North American Numbering Plan identifications, international telephone numbers, X.400 addressing, Internet addressing, and a wide variety of E-mail addressing schemes.

In order to process messages to and from external messaging systems using closed subscriber communities or private numbering plans, the communications system of the present invention must be able to interface with systems that require four digit addresses, ten digit addresses and other formats for both the sender and recipient addresses. For purposes of describing the unique address translation and message routing capability of the communications system of the present invention, the term "address" is the media specific address used to describe a subscriber. As discussed previously, a "user ID" is the unique global internal identifier of a particular user. A "community" is associated with a closed system or private numbering plan. All addresses must be unique within a community. "Scope" indicates the context in which the address should be used for the purpose of representing a particular user i.d. upon final delivery of a message. Scope enables the use of multiple addresses per user i.d. of the same address type. For example, an address with local scope is used when sending a message to the messaging system on which the address resides. Each user i.d. may have only one local scope address for each messaging facility. In comparison, an address identified as having global scope is used when interacting with other messaging systems.

As discussed previously, the media of a message, messaging features, and message subject matter are also used for routing purposes. The media field in the address table is used to perform per-media message routing and filtering by indicating which address and message system is to be used for final delivery of the message. The feature field is used to perform per-feature routing and filtering, such as sending urgent messages to a call message delivery system rather than a conventional voice mail facility. Messages can also be routed and filtered based on the subject matter of the message using the message subject matter field in the address table.

FIG. 14 is an example of a use of the address translation functions performed within the directory previously described. The sender in FIG. 14 is named Arnie and Arnie supplies his home messaging system which is known as CASJ01 with a message and the telephone number of his friend, Greg. Greg is a subscriber to the communications system of the present invention and resides on a messaging system known as TXDL03. Arnie supplies Greg's telephone number as 214-555-2722 when Arnie records the message to Greg. The CASJ01 system supplies the message and Greg's telephone number to the communications system of the present invention. The contacted network hub can identify the source messaging system by using either the source or destination network address such as the ANI or DNIS codes of the incoming call from the CASJ01 messaging system. As shown in FIG. 14, the communications system of the present invention accesses the copy of the address translation stored in the inbound network hub coupled to messaging system CASJ01 using the destination address, message media, the source address, and the source messaging system to retrieve the source user i.d. equal to 3, the community identification equal to 0, the destination user i.d. equal to 1 and the destination message system identified as TXDL03. This information is transmitted with the message to the outbound network hub which is associated with the TXDL03 messaging system.

The outbound network hub accesses its copy of the address translation table using the received information and retrieves Greg's destination address equal to 214-555-2722 and the appropriate source address for Arnie equal to 408-555-4437. The outbound network hub used the entry for Arnie corresponding to a "global" scope because the destination messaging system TXDL03 was not the same as the source messaging system VMX-ONEL. The use of the scope field allows the communications system of the present invention to interconnect users on different messaging systems within the same organization using short form addresses or users on different messaging systems using full length addresses.

Just as Arnie has different Local and Global scope entries in the address translation table, multiple table entries may also be used to route on the other variables discussed previously such as media, subject matter or messaging features like privacy or urgency.

The user profile directory stored within the communications system of the present invention is updated using a variety of mechanisms. For example, the customer service system 161 within the network center 37 is used to directly update the database. In addition, bulk changes in batch mode can be made to the master database 151 during the enlistment of large new groups of subscribers by downloading user profiles from new messaging systems.

In addition, various message protocols include fields within the protocols for basic database information such as spoken and ASCII name information. When this information is provided as part of the message, it is retrieved from the message to update the user profile information within the master database 151 used by the communications system of the present invention. As shown in FIG. 13, users and messaging system administrators can also directly affect the information in the master database 151 by using the interactive voice response system 169 or the customer computer interface system 167 operating in the network center 37. These systems allow users to alter the user profiles associated with their addresses and, as such, alter the routing and filtering of messages passing within the communications system of the present invention to them.

Some messaging systems are already network-compatible and are able to directly share database information with the communications system of the present invention. Access to the database stored within a messaging system is achieved through analog and digital connection processors 52 and 54 described previously.

Compound Messaging

Communications system 10 is operable to receive, transport, and deliver compound messages comprising information in more than one media. These messages can either be delivered as compound messages (if supported by the messaging system of the recipient), be disintegrated into their respective media parts and delivered to their various terminals for particular media type, or have one or more media parts converted into an alternative media for delivery as either a compound or disintegrated message.

For example, a single message received by communications system 10 may comprise both a voice message and a facsimile transmission. The communications system 10 is operable to route the voice portion to a voice messaging system and the facsimile to a facsimile messaging system both of which are associated with the message recipient. The communications system 10 is also operable to translate messages received in one media to a media associated with the facilities of the message recipient if the message recipient does not have the appropriate facilities. For example, if a compound message is received by communications system 10 comprised of a voice message and an electronic mail transmission but the message recipient only has a voice messaging facility and a facsimile messaging facility, communications system 10 will transmit the voice portion of the compound message to the message recipient's voice messaging facility and translate the electronic mail message to a facsimile image for delivery to the message recipient's facsimile messaging facility. For large scale integrated network functionality, interfacing with voice messaging systems introduces further complications for the processing of compound messages in that the accessing of the user profile records to perform compound message separation and delivery must be performed using the short, fixed length numerical addresses of the users of the communications system. Additionally, the receiving of the destination addresses for the received message must be performed with DTMF signaling and the native protocol of the user's messaging system.

Messaging Features

The communications system of the present invention supports the sophisticated messaging features currently in use by various messaging systems such as privacy, urgency, delivery confirmation, return receipt, deferred delivery and the like. The role of the communications system of the present invention as a translator between messaging systems of disparate protocols and capabilities results in a unique problem for the communications system of the present invention. A user of a messaging system that has a great many sophisticated features may desire to send a message to a recipient who is only accessible through a messaging protocol or messaging system that does not support some or all of those features. The user sending his message using the communications system of the present invention is allowed to select whether or not failed support of that feature causes the message to be returned or to be delivered anyway. Accordingly, the communications system of the present invention implements the "if possible" feature to provide for flexibility in communication between messaging systems of disparate capability. For example, messages within the communications system 10 may be labeled as "private", "private if possible", or "non-private." Typically, "private" messages are interpreted by a destination messaging system as a message that cannot be forwarded and so, if "privacy" were not supported, the message would be returned to the sender with the appropriate error message. The "private if possible" designation on a message causes the communications system of the present invention to implement privacy if the destination messaging system supports that feature; if not, the message is delivered anyway.

Similarly, the communications system of the present invention supports "urgency". Messages can be labeled on submission as High, Normal, or Low urgency which determines the maximum amount of time for delivery of the message to achieve the urgency requested by the sender. As with "privacy", messages can be labeled "urgent if possible", so if the destination messaging system supports urgency or a prioritization of messages, the message is sent as urgent; if not, the message is delivered anyway.

The unique capability of the communications system of the present invention to access a variety of messaging media allows for greater flexibility in the handling of urgent messages. For example, a user may select in his parameter list that when a message is received as urgent, the message is to be delivered to a selected messaging facility and, in addition, a phone call is to be placed to his pager or other telephone number, for example.

The ability of the communications system of the present invention to hold a variety of access points for a particular user within a directory table allows for the splitting of messages as well. For example, an electronic mail message may also include a portion of voice data. If a recipient's electronic mail facility is unable to support voice (for example, the recipient is using a personal computer that does not have any sort of sound capability), the communications system of the present invention can route the voice portion of the message to the voice mailbox of the recipient and the text portion of the message to the electronic mail facility of the recipient or, alternatively, the voice portion of the message could be translated to text using the media translation facility of the communications system of the present invention and delivered with the E-mail message. On the other hand, if the recipient only has a voice messaging system, the text portion of the E-mail could be translated into voice and delivered with the voice message.

The communications system of the present invention also supports the messaging features of delivery confirmation and return receipt. For delivery confirmation, a message is sent to the message sender with confirmation of delivery of the message to the recipient's mailbox. For read receipt, a message is sent to the message sender with the time the message was heard or accessed by the recipient.

The communications system of the present invention also supports deferred delivery where a message is held for delivery at a later time. In this manner, the communications system of the present invention provides a reminder network for a reminder of important events, such as meetings, birthdays, etc. Due to the storage capabilities inherent in the communications system of the present invention, this feature can be supported without being supported by the receiving messaging system. For large scale integrated network functionality, interfacing with voice messaging systems introduces further complications for the providing of messaging features, such as privacy, urgency, delivery confirmation, etc. In the context of interaction with voice messaging systems, these features must be created, maintained, and accessed in the user profile records using the short, fixed length numerical addresses of the users of the communications system. Additionally, the receiving of these messaging features must be performed with DTMF signaling and the native protocol of the user's messaging system.

Mailing List Distribution

The communications system of the present invention supports mailing list distribution of messages using two methods. The first method uses the facility of a local alias, such as a group code which references a number of addresses. According to this facility, when the sender of the message accesses the group code, the message is replicated and a separate message is sent to each address referenced by the group code from the sender. The second method of sending a message to a large number of recipients is through a mailing agent such as, for example, bulk mailing list agent 171 discussed with reference to FIG. 13 previously and used in the case of mass distributions of information from the information providers databases 39. According to this method, the sender sends the message to the mailing agent with the list of intended recipients. The mailing agent is an address that acts as an alias for the sender to send the message to the message recipients.

The distinction between the two methods arises in the case of errors, returned messages, and message replies. When the alias feature is used, errors, returned messages, and message replies are forwarded to the actual sender of the message. This is useful if it is essential for the sender to know the ultimate disposition of all of the messages sent. In contrast, the mailing agent is the recipient of all error messages or receipt notifications when the mailing agent is used as the sender. One embodiment of the present invention utilizes the bulk mailing list agent 171 to distribute advertising or other information to a large number of recipients. This feature may be used, for example, to distribute content specific advertising to selected members of the user population based upon their user profile. In this particular embodiment, the sender of the message merely wants to know that the message was at least attempted to be sent to the entire class of intended recipients. In this application, the use of the bulk mailing list agent 171 is essential to the efficient distribution of these mass messages. For large scale integrated network functionality, interfacing with voice messaging systems introduces further complications for the providing of mailing list distribution, such as group codes and bulk mailing lists in that these features must be created, maintained, and accessed in the user profile records using the short, fixed length numerical addresses of the users of the communications system. Additionally, the receiving of these messaging features must be performed with DTMF signaling and the native protocol of the user system.

Message Routing

The distribution of messages to a large number of recipients is aided by the fact that the communications system of the present invention includes a message subject matter field with each message upon which the communications system can filter and route messages given the preferences of each user. The subject matter indication allows a sender of a message of the communications system of the present invention to designate the type of information within the message. Possible identifications include personal information, unsolicited advertising, commercial messages, or other such classes of messages. Using this feature, advertising information can be further subdivided using a message content type field. When a user is enrolled into the communications system, he can specify the types of messages he wishes to receive that reflect the user's particular interests or hobbies and to what messaging system those messages are to be routed. As discussed previously, users can alter the parameters of their user profiles including this information stored in the master database 151 through interactive voice response system 169 or customer computer interface system 167 contained in the network center 37.

The message subject matter information can also be used to route messages based on their content. For example, personal messages from a particular person might be routed directly to a special recipient facility whereas advertising material could be routed to a different facility. Further, messages of a certain content type or messages from certain senders may be blocked based upon user preferences.

Users of the communications system of the present invention may be encouraged to receive advertising messages by crediting an account associated with the user for each advertising message received and accessed. Accordingly, a single user may maintain several mailboxes or recipient facilities expressly for the purpose of categorizing and managing incoming messages. Messages passing through the communications system of the present invention can be routed on the basis of the message subject matter, message content type, and the source address. Any permutation of these three factors can be used to route the message to any of the recipient's various messaging systems.

For example, a user can specify that advertising material from a particular source, even though it comes in the form of a facsimile transmission, should be translated and routed to a particular E-mail address which the user has dedicated to advertising material to prevent the advertising material from cluttering up the user's other messaging facilities. Further, a user may require that any electronic mail message of a personal nature from a particular sender is to be immediately translated into a voice message and placed in a mailbox and, further, that a pager call is to be instituted to the user to alert him that the message is present in the voice mailbox.

For large scale integrated network functionality, interfacing with voice messaging systems introduces further complications for the providing of message routing services in that the message subject matter field which is used for routing and filtering must be created, maintained, and accessed in the user profile records using the short, fixed length numerical addresses of the users of the communications system. Additionally, the routing and filtering of messages must be performed on messages that have been received with DTMF signaling and the native protocol of the user's messaging system.

Message Tracking and Revocation

As described previously, the network hubs within the communications system of the present invention maintain constant contact with one another through the communication network 18 to constantly update both the master database 151 of user profile information and messaging tracking system 163 with administrative information regarding the status of each message that is present within the communications system 10.

In this manner, the network center 37 holds a record of the presence and status of every message that is being routed within the communications system 10 before the message has been delivered. To perform this function, message tracking system 163 is accessed through HelpLine system 157, customer computer interface system 167 or interactive voice response system 169 to determine the current location of a given message and if necessary, to cancel delivery and return it to the sender.

Message Submission from and Delivery to Nonsubscribers

The communications system of the present invention allows for the use of the communications system by nonsubscribers through public access facilities into the communications system 10. For example, a conventional telephone line may route nonsubscribers into interactive voice response system 169 or customer computer interface system 167 which collects information on the nonsubscribers such as their identification confirmation, the address for the message delivery features desired, and if necessary, billing information. Message submission from nonsubscribers can be billed on a per-message basis using 900 or 976 telephone numbers, credit cards, or on a collect basis to those subscribers who agree to pay the cost of a collect message.

Message delivery to nonsubscribers is also supported. In this manner, whenever a subscriber or a nonsubscriber sends a message using communications system 10 to a recipient who also a nonsubscriber to communications system 10, the message will be delivered to the recipient using whatever means are available to communications system 10 for the particular media type.

For voice messages or messages of other media which must be converted to voice to be delivered, communications system 10 will repeatedly attempt to call the recipient to deliver the message. Once the connection is made to the destination telephone number, the called party may use interactive voice response system 169 or similar interactive voice response systems within each network hub to facilitate delivery of the message. Secure messages are received by using a password to access the message. Interactive voice response system 169 asks the answering party to enter the appropriate password and will only deliver the message if the password is entered. Further options available to the answering party include redirecting the message to a messaging system or to another party in the case of misdelivery. Further, the answering party is also given the option to terminate delivery of the message if the intended recipient is not available and will not be available at any time. The sender of the message will then be notified using a message generated by the communications system that the message was undeliverable. Additionally, the answering party may also enter a time when the intended recipient of the message would like redelivery of the message. For large scale integrated network functionality, interfacing with voice messaging systems introduces further complications for the providing of interactive voice response services. For example, the providing of this service must be performed using standard telephone equipment using DTMF signaling, addressing must be numerical, voice must be the only media, identification confirmation must be spoken, and directory access/inquiry must be performed using DTMF signaling.

Disaster Recovery

The master database 151 includes, as described previously, constantly updated status information on messaging traffic within communications system 10 which is constantly updated for each subscriber. In addition, master database 151 contains configuration information for each messaging system coupled to communications system 10. In this manner, a large scale failure in a messaging system can be quickly restored by reconfiguring a new system using the configuration information within the master database 151. For example, if a disaster such as a fire were to strike a messaging system coupled to the communications system 10, a new messaging system could be loaded with all of the configuration data stored in the master database 151 to greatly speed the process of returning messaging capability to the subscribers.

In addition, the large storage capability within the communications system of the present invention can be used to provide storage of all messages directed to the failed messaging system until the new system is in place. The stored messages then can be downloaded in batch mode to the newly configured replacement system when it is brought on-line. In this manner, the communications system 10 provides redundant security to all messaging systems connected to the communications system 10 and provides for intermediate storage of messages during disaster recovery.

Secure Messaging Traffic

The communications system of the present invention utilizes Internet Privacy-Enhanced Mail (PEM) technology and the master database 151 to implement a public key cryptographic system to support the scrambling of messages for secure communications. For example, a message sent to a mailbox regularly read by several people, such as one read by a secretary and a supervisor, can be encrypted such that only one individual can decode the message using a secret key or double password. Other uses include private non-subscriber delivery whereby a message delivery can only be made to a specific non-subscriber if the person answering the call has the key to the encrypted message.

While PEM is a public standard and can be implemented in other contexts, the key management infrastructure to make a public key cryptographic work is difficult without a centralized authority. The communications system of the present invention uses master database 151 to provide an immediate advantage over a peer-to-peer networking system. For large scale integrated network functionality, interfacing with voice messaging systems introduces a further complication for the providing of secure messaging services, in that the public key which is used for encrypting and decrypting must be created, maintained, and accessed in the user profile records using the short, fixed length numerical addresses of the users of the communications system.

Identification Confirmation

A key aspect of a socialization of users of a networked messaging facility is the ability to confirm the identification of a recipient of a message. In other words, people are much more willing to leave a message or transmit information to a person when they receive confirmation from the communications system that the communications system is aware of the identity of the intended recipient and can present the sender with some information that creates a sense of security that it is the proper recipient. This information may be a still portrait or full motion video of the intended recipient in the video context, a rendition of the person's spoken or spelled name in the audio context, or a textual or graphic representation of the person's name either as text data or as an image of the person's signature. The user profiles contained in master database 151 and in each network hub include identification confirmations. It should be understood that the identification confirmations associated with the system of the present invention comprise more information than has been provided by prior directory based systems. For example, some prior systems have provided for directory confirmation as a user inputs the letters of an intended recipients name. These systems do not provide information other than the names from the directory and do not help to resolve the dilemmas presented by persons having the same name or directory entry. According to the teachings of the present invention, however, a subscriber who has the full capabilities of communications available to the subscriber may have data stored in the subscriber's user profile that includes the user's portrait or video of the subscriber. The same user may also have the ASCII spelling of the subscriber's name, a digitally encoded recording of the subscriber speaking his or her own name, and a graphic image of the subscriber's signature. In this manner, no matter the media of the sender, be it text, voice or video, the network can respond with information from the user's profile which will allow the sender to feel secure that the communications system is aware of the intended recipient and the appropriate recipient has been identified. The user profiles contained on master database 151 are continuously updated to allow for changes to identification confirmations of each user.

In addition, user profile information for non-subscribers is also accumulated by master database 151 by requesting identification confirmations and addressing information when nonsubscribers send messages on communications system 10. For example, when a nonsubscriber sends a message for another nonsubscriber or for a subscriber using interactive voice response system 169, interactive voice response system 169 will ask the sender to also transmit their identification confirmations. These identification confirmations are stored with the address of the sender as a new entry in master database 151. Accordingly, this user profile information is then available to future senders of messages to this nonsubscriber. Likewise, when a message is received by a nonsubscriber, the nonsubscriber may be asked to provide identification confirmations and other information for delivery of messages in the future.

For large scale integrated network functionality, interfacing with voice messaging systems introduces a further complication for the providing of identification confirmation services because this service is usually a spoken name and must be replayed to the user via standard telephone equipment. The spoken name is a large, digitized segment of audio that must be stored and replayed to message senders in real time as messages are sent.

Extended Absence Processing

Many messaging systems allow for the extended absence notification to message senders. In essence, if a user will not be checking for messages due to being away from his office, place of business or home for an extended period, or for another reason, a notification can be provided to message senders to apprise them of that fact. This notification can be uploaded to the communications system and recorded in the user's profile in master database 151. Accordingly, instead of or in addition to identification confirmation being provided to a sender attempting to send a message to a recipient with an extended notification in place, the sender of the message will receive the extended absence notification. In this manner, before or after the message is sent, the sender of the message will be notified that the intended recipient of the message will not be checking messages for an extended period of time. The sender may then decide to send the message anyway or pursue other options to contact the intended recipient. For large scale integrated network functionality, interfacing with voice messaging systems introduces a further complication for the providing of extended absence services because this service is a spoken greeting and must be replayed to the user via standard telephone equipment. The extended absence greeting is a large, digitized segment of audio that must be stored and replayed to a sender in real time as messages are sent.

Directory, Addressing, and Routing Services

The communications system of the present invention can also provide messaging systems with directory addressing services. Messaging systems can connect to communications system 10 to utilize the directory and addressing information stored in the communications system 10 to determine how to deliver a message to another messaging system. For example, a messaging system attempting to deliver a message to another messaging system can contact communications system 10 to obtain all the necessary information required to deliver the message based upon whatever addressing information was originally entered by the sender of the message. Communications system 10 then performs the address translation function described previously to retrieve the information needed by the sending messaging system to enable it to make its own connection to the other messaging system to deliver the message. In this manner, messaging systems can access the entire database of user addressing information even if they do not use the communications system 10 to transport and deliver the message.

Billing and Accounting Operations

The billing system 159 within the network center 37 interacts with the central access and control system 155 which in turn stores and processes all of the billing events that occur on communications system 10 to create billing records associated with services performed by the communications system 10. An account is maintained for each user and the costs of services provided by communications system 10 are determined by each user's class of service. Services for delivery of messages may be billed in a similar fashion to that of conventional telephone calls using V&H coordinates with time of day discounts, day of week discounts and other selectable pricing structures.

Additional fees may be charged for other administrative services such as directory and address services, message tracking and revocation, media and protocol conversions, language translation, or the generation of message traffic reports to enable users of the communications system to monitor and account for message expenses.

The message priority system used in the communications system of the present invention and discussed previously allows for the communications system to offer different quality of service levels. For example, while some users may require virtually instantaneous message delivery, many users are willing to settle for longer message delivery times in exchange for discounted pricing structures. The message priority system used by communications system 10 allows the communications system to guarantee maximum message delivery times for the various classes of service.

As discussed previously, the communications system 10 provides an efficient gateway for information providers to provide services to advertisers to access a large number of customers. The communications system allows for mass distribution of information services or advertising materials to selected users who have expressed an interest in particular classes of information using their user profiles. In the case of information services, users may be billed based upon the quantity and quality of information requested.

As an incentive to get users to accept advertising material, the billing system 159 may credit the account associated with a user a small amount when the user accepts and reviews an advertising message. In addition, communications system 10 can interact with users after receipt of an advertising message through interactive voice response system 169, customer computer interface system 167, or directly through the external interface 62 using a real time communication protocol to input orders for these advertised goods. These orders may be optionally billed to the user's account within the communications system 10. In such a case, the billing system 159 will add the charge to the user's account and will also charge the information provider or advertiser a fee for processing the order.

Directory Services

Communications system 10 can provide directory services to both message senders, subscribers and non-subscribers to allow them to locate a particular person to whom they might wish to send a message. As such, communications system 10 can guide a message sender through an automated directory access to the appropriate record in the database of directory information in order to locate the particular message recipient. A variety of systems may be presented to the user depending upon the particular messaging system and its interface with the message sender. For example, if the interface with the user is through a conventional analog line, directory access can be through interactive voice response system 169 using DTMF signals from the user's touchtone phone. The interactive voice response system 169 can first ask the message sender for categories of known information about the message recipient; for example, prompting the message sender to enter on the telephone whatever information is known about the message recipient such as the message recipient's: name, telephone number, city, company, the products and services offered, or other information. Each successive response by the message sender provides additional information which narrows the search through the master database 151 until finally the particular message recipient is identified. At such time, the identification confirmation for the identified message recipient is presented to the message sender to confirm proper message recipient has been identified.

For more complex interfaces with message senders, the automated directory can be accessed using customer computer interface system 167. In this environment, the customer computer interface system 167 can present the message sender with an automated telephone directory in graphical form with entries based on geography, company names or the products and services offered by the message recipient. In this scenario, the location of the message recipient can result in the presentation of the identification confirmation for the identified recipient as well as information identifying the messaging facilities available for the identified recipient. In this manner, the message sender can select the media of delivery of the message, if supported, as determined by the user profile information of the message recipient.

For large scale integrated network functionality, interfacing with voice messaging systems introduces further complications for the providing of directory and addressing operations services in that the address which is used for delivery and routing must be created, maintained, and accessed in the user profile records. Additionally, textual search criteria must be entered using a ten-digit numeric keypad. Further, the providing of an interactive voice response capability must be performed using standard telephone equipment using DTMF signaling, addressing must be numerical, voice or spoken, spelled text must be the only media, identification confirmation must be spoken, and directory access/inquiry must be performed using DTMF signaling.

Language Translation

According to a further aspect of the present invention, the communications system 10 is operable to translate messages between different languages to accommodate messaging between users, both subscriber and non-subscriber. An entry in each user profile indicates the user's language of choice. This indication is used by the communications system to determine the language used by the user as a sender of a message and the preferred language for receipt of messages. The language of choice indications of the sender and the recipient are used by the communications system to select the appropriate translator to use on the message. Regardless of the media of the incoming message, be it a compound message or otherwise, communications system 10 translates all parts of the message into a textual format to allow for the automated translation of the text message to take place. The translated message may then be converted into the media supported by the messaging system of the message sender.

Directory Management

Communication systems often include spoken name confirmation and spell or address by name information. Spoken name confirmation of a dialed address provides a necessary degree of confidence that an address has not been mis-dialed or that the message will actually be delivered to the person for whom it was intended. Spell or address by name information provides a limited white pages directory service whereby a subscriber can dial numbers on the telephone keypad corresponding to the text name of the recipient.

Traditional store-and-forward network systems, such as that provided by analog voice messaging protocols, do not provide direct access to spoken name confirmation or to spell or address by name information of a recipient. To overcome this problem, a copy of the spoken and the text name of system users may be stored on a sender's messaging system in a cache directory. Storage of spoken and text names in a cache directory is problematic for a communications system in that the stored spoken and text names may be out-of-date or even invalid. The present invention allows network communication systems to provide reliable spoken confirmation and spell or address by name information by validating confirmation information given by a messaging system prior to delivering messages.

Figures 15, 16A, 16B, 16C:
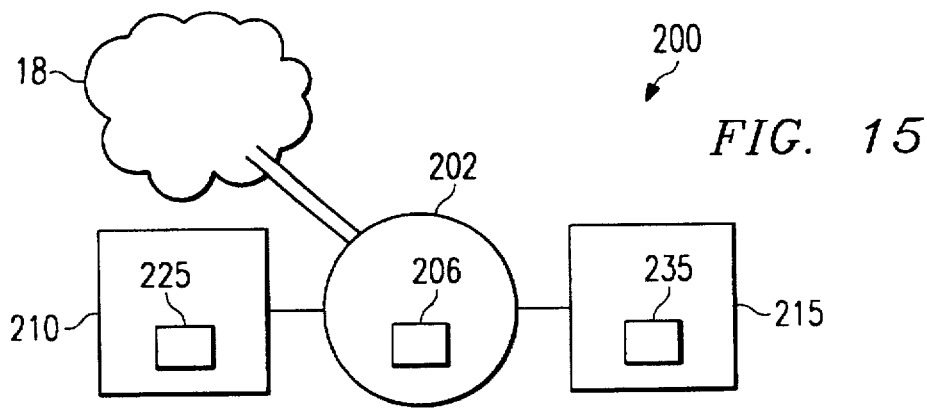
FIG. 15 is a schematic illustration of the system used by the present invention to implement directory management.

FIG. 15 is a block diagram which illustrates the implementation of the present invention that provides directory management through validation of recipient confirmation and through demand based updates. Referring to FIG. 15, a communications system 200 includes a hub 202. The hub 202 is connected to the communications cloud 18 described with reference to FIG. 1 previously. Hub 202 may be constructed identically as hubs 12, 14 and 16 described previously. Hub 200 is connected to a sending messaging system 210 and to a receiving messaging system 215. Messaging systems 210 and 215 may comprise conventional messaging systems that each access the hub 200 through one or more ports.

The hub 202 includes a hub directory 206 comprising a number of directory entries. The sending messaging system 210 includes a sending system directory 225. Sending system directory 225 may be a cache. Receiving messaging system 215 includes a receiving system directory 235. The sending system directory 225 and the receiving system directory 235 includes a number of directory entries.

FIG. 16 is a representation of the hub directory 206, sending system directory 225, and receiving system directory 235 that may be used by the hub 202 to validate a recipient confirmation. The receiving system directory 235 is the authoritative source for directory information. The receiving system directory 235 is generally part of the mailbox itself.

The receiving system directory 235 includes a plurality of receiving system directory entries 240. Each receiving system directory entry 240 includes a local mailbox address and a time stamp of the directory entry. According to one embodiment, each receiving system directory entry 240 includes a creation time stamp 241 and an update time stamp 242. The creation time stamp records the date that the mailbox was created or assigned to the current user. This date does not change until the mailbox is deleted or reassigned in the receiving system directory 235. For example, in receiving system directory 235, mailbox 465 was created or assigned to Newbie on Jan. 12, 1996. The update time stamp 242 records the last update of the receiving system directory entry 240 in the receiving system directory 235. This time is reset every time a user or system administrator updates the directory.

The hub directory 206 is an intermediate directory. It is both a server directory and a cache directory. The hub directory 206 provides information as though it were the authoritative source to directories down-the-line while itself being a cache. There may be more than one hub directory 206 in series between the receiving system directory 235 and the sending system directory 225.

The hub directory 206 includes a plurality of hub directory entries 243. As described below in detail, the hub directory 206 is populated from the receiving system directory 235 as messages addressed to mailboxes of the receiving system directory are routed through the hub 202. Each hub directory entry 243 includes a time stamp of the hub directory entry 243. Preferably, each hub directory entry 243 includes a mailbox creation time stamp 244 and an update time stamp 245. The creation time stamp 244 records the earliest time the hub knew that the directory entry was assigned to the user. Ideally, the creation time stamp 244 of the hub directory entry 243 should be identical to the creation time stamp 241 of the receiving system directory entry 240. However, the creation time stamp 244 may be the first time a message was sent or received by the hub 202 from a given mailbox.

As previously discussed, the sending system directory 225 is stored on the sending messaging system 210. Accordingly, the sending system directory 225 provides the sending system directory entry 246 used by the sending messaging system 210 to provide a confirmation of a recipient. Recipient confirmation may be spoken name confirmation. Spell or address by name information may also be provided.

Each sending system directory entry 246 includes an address through which a message may be sent to recipients and a time stamp 247 of the sending system directory entry 246. The update time stamp 247 records the time of a last updated verification of the sending system directory entry 246 in the sending system directory 225. This time is reset every time that the sending system directory entry is sent to the sending system directory 225. As will be described in detail below, as long as a sending system directory update time stamp 247 is more recent than the mailbox creation time stamp of the hub or receiving messaging system, the sending system directory entry 246 and thus the recipient confirmation provided by the directory entry is valid. Where the update time stamp 247 of the sending system directory entry 246 is older than the mailbox creation time stamp of the hub or receiving messaging system, the sending system directory entry 246 is invalid. Where the sending system directory entry 246 of the sending system directory 225 is older than the update time stamp of the hub or receiving system directory, the sending system directory entry 246 is valid but out-of-date and should be updated.

Figure 17:
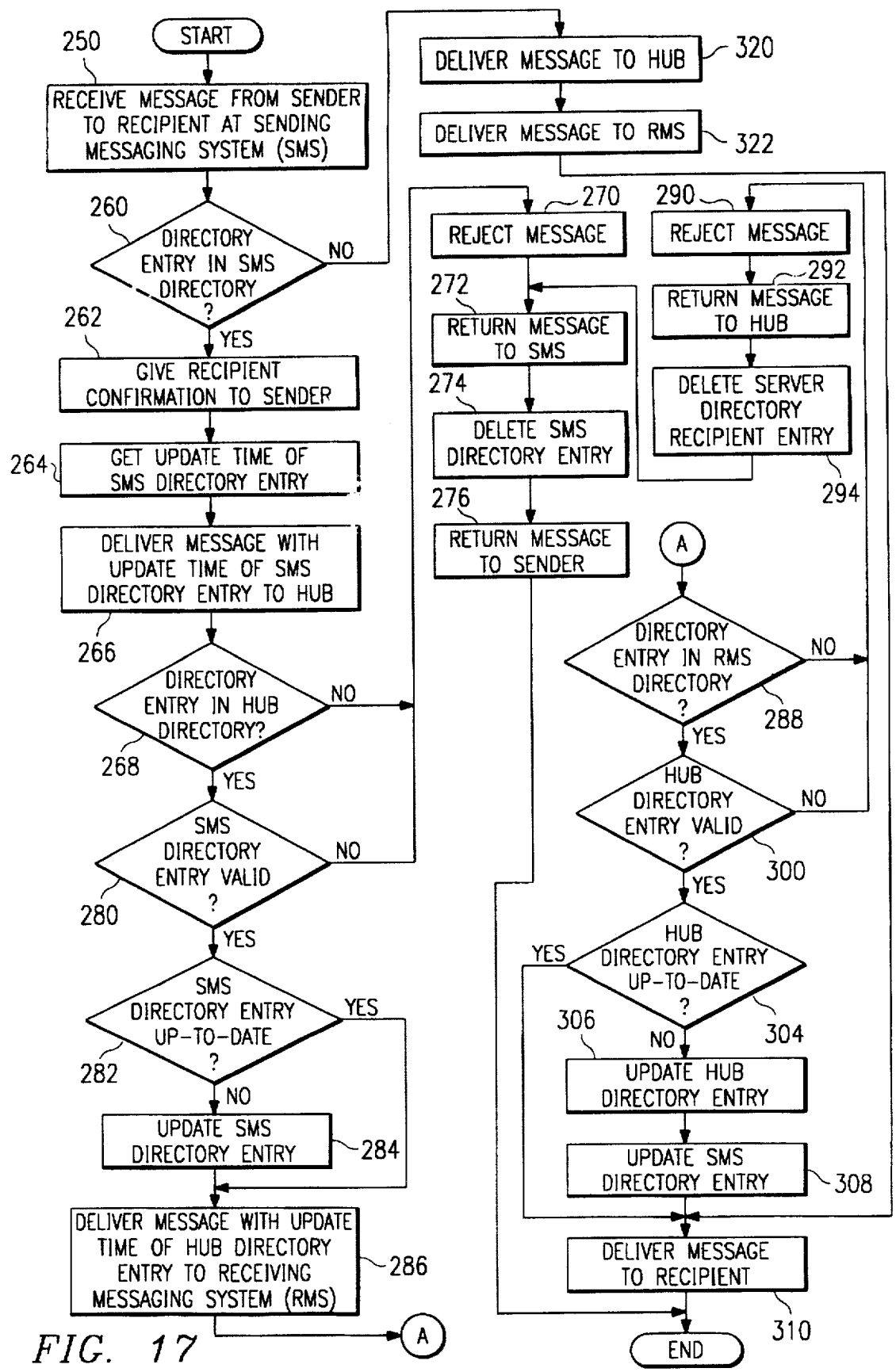
FIG. 17 is a flow diagram of the method used by the present invention to implement directory management.

FIG. 17 illustrates the method used by the present invention to implement validation and demand based updates. The method begins at step 250 wherein the sending messaging system 210 receives a message from a sender. The message is addressed to a recipient. Next, at decisional step 260, the sending messaging system 210 determines if a sending system directory entry 246 exists for the recipient in the sending system directory 225 of the sending messaging system 210. If a directory entry exists, the YES branch of decisional step 260 leads to step 262.

At step 262, the sending messaging system 210 uses the directory entry 246 to provide a recipient confirmation to the sender. As previously discussed, the recipient confirmation may be spoken name confirmation. Next, at step 264, the sending messaging system 210 retrieves the update time stamp 247 of the sending system directory entry 246 used for recipient confirmation.

Proceeding to step 266, the sending messaging system 210 delivers the message along with the update time stamp 247 to the hub 202. At decisional step 268, the hub 202 determines whether a hub directory entry 243 exists for the recipient in the hub directory 206.

If the hub directory entry 243 does not exist for the recipient in the hub directory 206, it is assumed that the sending system directory entry 246 of the sending system directory 225 is invalid. This is because the directory entry of the recipient was likely deleted from the hub directory 206 after it became invalid. Thus, the sending system directory entry 246 of the sending system directory 225 is likely also invalid. Accordingly, the NO branch of decisional step 268 leads to step 270 wherein the message is rejected by the hub 202. Next, at step 272 the hub 202 returns the message to the sending messaging system 210. At step 274 the hub 202 initiates a directory update to delete the invalid sending system directory entry 246 from the sending system directory 225 of the sending messaging system 210. At step 276, the sending messaging system 210 returns the message to the sender. Thus, a message sent based on an invalid recipient confirmation is returned to the sender and not mis-delivered.

Returning to decisional step 268, if the hub directory 206 includes a hub directory entry 243 for the recipient, the directory entries of the hub directory 206 and of sending system directory 225 may be compared to determine the validity of the recipient confirmation given by the sending messaging system 210. Accordingly, the YES branch of decisional step 268 leads to decisional step 280.

At decisional step 280 the hub 202 validates the recipient confirmation that was given by the sending messaging system 210 by comparing the mailbox creation time stamp 244 of the hub directory entry 243 to the update time stamp 247 of the sending system directory entry 246. If the update time stamp 247 is older than the mailbox creation time stamp 244, the sending system directory entry 246 used for recipient confirmation is invalid. The NO branch of decisional step 280 leads also to step 270.

If the update time stamp 247 is as or more recent than the mailbox creation time stamp 244, the sending system directory entry 246 of the sending system directory 225 is valid. Thus, the recipient confirmation based on the sending system directory entry 246 is also valid. The YES branch of decisional step 280 leads to decisional step 282.

At decisional step 282, the hub 202 determines an update status of the sending system directory entry 246 used by the sending messaging system 210 for recipient confirmation by comparing the update time stamp 245 of the hub directory entry to the update time stamp 247 of the sending system directory entry 246. If the update time stamp 247 is less recent than the update time stamp 245, the recipient entry 246 of the sending system directory 225 is out-of-date. The NO branch of decisional step 282 leads to step 284. At step 284 at the hub 202 updates the directory entry 246 of the recipient in the sending system directory 225. The hub 202 accomplishes the update by initiating a directory update of the directory entry 243 of the hub directory 206 to the sending system directory 225.

Step 284 leads to step 286. Additionally, the YES branch of decisional step 282 leads to step 286. At step 286, the hub 202 delivers the message with the update time stamp 245 of the hub directory entry 243 to the receiving messaging system 215.

Next, at decisional step 288 the receiving messaging system 215 determines whether a directory entry 240 exists for the recipient in the receiving system directory 235. If a directory entry 240 does not exist in the receiving system directory 235, the hub directory entry 243 used to validate the recipient confirmation and the sending system directory entry 246 used to provide the recipient confirmation are invalid. Accordingly, the NO branch of decisional step 288 leads to step 290.

At step 290, the message is rejected by the receiving messaging system 215. Next, at step 292 the receiving messaging system 215 returns the message to the hub 202. Proceeding to step 294, the hub directory entry 243 of the recipient in the hub directory 206 is deleted. Recipient entry 243 may be deleted from the sending messaging system 210 by initiating a directory update. Step 294 returns to step 272 where the message is further returned from the hub 202 to the sending messaging system 210. As previously described, the message is thereafter returned to the sender.

Returning to decisional step 288, if a directory entry of the recipient exists in the receiving system directory 235, the YES branch of decisional step 288 leads to decisional step 300. At decisional step 300 the receiving messaging system 215 determines whether the hub directory entry 243 is valid by comparing the update time stamp 245 of the hub directory entry 243 to the mailbox creation time stamp 241 of the receiving system directory entry. If the update time stamp 245 is less recent than the mailbox creation time stamp 241, then the directory entry 243 of the hub directory 206 is invalid, as is the directory entry 246 used for the recipient confirmation. Accordingly, the NO branch of decisional step 300 leads also to step 290 where the message is rejected by the receiving messaging system 215 and thereafter returned to the hub 202.

If the update time stamp 245 is more recent than the mailbox creation time stamp 241, the directory entry 243 of the hub directory 206 is valid and the YES branch of decisional step 300 leads to step 304.

At decisional step 304, the receiving messaging system 215 determines an update status of the hub directory entry by comparing the update time stamp 242 of the receiving system directory 235 to the update time stamp 245 of the hub directory 206. If the update time stamp 245 is less recent than the update time stamp 242, the directory entry 243 is out-of-date and the NO branch of decisional step 304 leads to step 306.

At step 306, the directory entry 243 of the hub directory 206 is updated. Next, at step 308, the directory entry 243 of the sending system directory 225 is also updated. Both updates may be accomplished by a directory update of the receiving system directory entry 240.

Step 308 leads to step 310. Returning to decisional step 304, if the hub directory entry 243 is up-to-date, the YES branch of decisional step 304 leads also to step 310. At step 310 the message is delivered to the recipient. Accordingly, the message is only delivered to the recipient where the recipient confirmation given to the sender is validated at the receiving system directory 235 of the recipient.

Returning now to decisional step 260, it was determined whether a directory entry 246 of the recipient exists in the sending system directory 225 of the sending messaging system 210. Because the present invention relies, at least in part, on demand based updates, a directory entry 246 may not yet exist for the recipient in the sending system directory 225. Thus, for example, the first time a message is addressed from the sending messaging system 210 to a new recipient, a directory entry 246 may not exist in the sending system directory 225. In such a case, no recipient confirmation can be given to the sender. Accordingly, there is no recipient confirmation to validate. Thus, the NO branch of decisional step 260 leads to step 320. At step 320, the message is delivered to the hub 202. The hub 202 accepts the message and at step 322 and delivers the message to the receiving messaging system 215. Step 322 leads to step 310 wherein the message is delivered to the recipient.

The following illustrative example of validation using the method and system of the present invention are provided to further the reader's understanding. As shown by the directories of FIG. 16, mailbox "1 214 555 2710" is assigned to Carl. It has not changed in a long time. A directory entry for Carl exists in both the hub 202 and the sending messaging system 210. Mailbox "1 214 555 7465" was previously assigned to Brent and has been reassigned to Newbie without updating the hub 202. Thus, the hub directory 206 still has Brent recorded as the owner. Additionally, the sending messaging system 210 also has Brent as the owner in the sending system directory 225. Mailbox "1 214 555 7494" was previously assigned to Bill. This mailbox was deleted from the receiving system directory 235 without updating the hub 202. The sending messaging system 210 also still has Bill as the owner in the sending system directory 225. Mailbox "1 214 555 2738" is a fairly new mailbox assigned to Kris but not present either on the hub 202 or on the sending messaging system 210. Mailbox "1 214 555 7474" is assigned to Sue, a user long since deleted from the receiving messaging system 215 and the hub 202, but never deleted from the sending system directory 225 of the sending messaging system 210.

In the following examples, Sam sends messages from the sending messaging system 210. The first example illustrates a message sent to a recipient having directory entries in the hub and receiving system directories. Sam addresses a message to "1 214 733 2710" and receives a spoken name for Carl. The message is sent from the sending messaging system 210 to the hub 202 with the update time stamp 247 of Sep. 1, 1995. For the convenience of the reader, time stamps are illustrated as dates. In one embodiment, however, the time stamps may include encoded time of day information. Thus, time stamps from a same day can be compared. The hub 202 compares the update time stamp 247 of Sep. 1, 1995 and determines that this date is later than the mailbox creation time stamp 244 for Carl of Jun. 1, 1988. Accordingly, the hub 202 accepts the message. The hub 202 further compares the update time stamp 247 of Sep. 1, 1995 to the update time stamp 245 of Dec. 1, 1995 and determines that the directory entry of the sending system directory 225 is out-of-date. Accordingly, the hub 202 initiates a directory update to update the directory entry 246 for Carl. Hub 202 delivers the message to receiving messaging system 215 with the update time stamp 245 of Dec. 1, 1995. The receiving messaging system 215 compares the update time stamp 245 of Dec. 1, 1995 and determines that this date is later than the mailbox creation time stamp 241 of the receiving system directory entry 240 for Carl of Jun. 1, 1988. Accordingly, the receiving messaging system 215 accepts the message. The receiving messaging system 215 delivers the message to Carl's mailbox.

The following example illustrates a message sent to a recipient which no longer exists in the receiving system directory 235 or in the hub directory 206. Sam addresses a message to "1 214 407 7474" and receives a spoken name for Sue. The message is sent from the sending messaging system 210 to the hub 202 with the update time stamp 247 of Nov. 1, 1995. The hub 202 has no hub directory entry 243 for Sue. With no directory entry 243, no date can be compared to the directory entry 246 of the sending system directory 225. The recipient confirmation is assumed to be invalid. Accordingly, the hub 202 rejects the message. The message is returned from the hub 202 to the sending messaging system 210 and thereafter returned to Sam. Accordingly, the recipient confirmation, although given to the sender, was determined invalid and the message was returned without a mis-delivery.

The following example illustrates a message sent to a recipient which has been deleted from the receiving system directory 235 but still exists in the hub directory 206 and the sending system directory 225. Sam addresses a message to "1 214 407 7494" and receives a spoken name for Bill. The message is sent from the sending messaging system 210 to the hub 202 with the update time stamp 247 of Sep. 15, 1995. The hub 202 compares the update time stamp 247 of Sep. 15, 1995 and determines that this date is later than the mailbox creation time stamp 244 of the hub directory entry 243 for Bill of Sep. 1, 1995. The hub 202 accepts the message. The hub 202 also compares the update time stamp 247 of Sep. 15, 1995 and determines that this date is less recent than the update time stamp 245 of the hub directory entry for Bill of Dec. 1, 1995. Accordingly, the hub updates the directory entry of Bill in the sending system directory 225 by initiating a demand push. The message is sent from the hub 202 to the receiving messaging system 215 with the update time stamp 245 of Dec. 1, 1995. The receiving system directory 235 does not contain a directory entry 240 for Bill as it has previously been deleted. Thus, the recipient confirmation given by the sending messaging system 210 is invalid. Accordingly, the receiving messaging system 215 returns the message to the hub 202 which returns the message to the sending messaging system 210. In turn, the sending messaging system 210 returns the message to the sender. Thus, even though an invalid directory entry 243 remained in the hub 202 to initially validate the recipient confirmation, the message is still not delivered because the method and system of the present invention rely on final validation from the receiving system directory 235, which is the source of the mailbox.

The following example illustrates a message sent to a valid destination where a mailbox has been reassigned without the hub 202 or the sending messaging system 210 receiving an update. Sam addresses a message to "1 214 407 7465" and receives the spoken name for Brent. The message is sent from the sending messaging system 210 to the hub 202 with the update time stamp 247 of the sending system directory entry 246 for Brent of Nov. 1, 1995. The hub 202 compares the update time stamp 247 of Nov. 1, 1995 and determines that this date is later than the mailbox creation time stamp 244 of the hub directory entry for Brent of Aug. 1, 1993. The hub 202 accepts the message. The hub 202 also notes that the directory entry of the sending system directory entry for Brent is up-to-date. The message is sent from the hub 202 to the receiving messaging system 215 with the update time stamp 245 of the hub directory entry for Brent of Nov. 1, 1995. The receiving messaging system 215 compares the update time stamp 245 of Nov. 1, 1995 and determines that this date is less recent than the mailbox creation time stamp 241 of the receiving system directory entry of Jan. 12, 1996. Accordingly, the mailbox to which the message was addressed has been reassigned since the time of the sending system directory entry for Brent that was used for recipient confirmation. The receiving messaging system 215 returns the message to the hub 202 which returns the message to the sending messaging system 210. In turn, the sending messaging system 210 returns the message to the sender. Accordingly, the message for which spoken name confirmation was received for Brent is not mis-delivered to Newbie, who is the new owner of the mailbox to which the message was addressed.

The following example illustrates a message sent for which the sending messaging system 210 does not have a directory entry. Sam addresses a message to Kris at "1 214 733 2738". Because the receiving system directory 225 does not include a directory entry 246 for Kris, no spoken name confirmation is given. The message is sent to the hub 202. The hub 202 delivers the message to the receiving messaging system 215, which delivers the message to Kris. Thus, in the instances where the sending messaging system 210 does not include a directory entry 246 for the recipient, recipient confirmation is not given and there is no need to validate that confirmation.

In addition to the validation and demand based updating previously described, the present invention may employ other update systems and methods. For example, the hub 202 may provide a periodic update by scanning the directory tables for entries which are older than a configured interval. Using a periodic update, the hub 202 may send verification requests to the receiving system directory 235 for directory entries of the hub and sending system directories that are older than the configured level. Receiving the updated information from the receiving system directory 235, the hub 202 may initiate directory update messages to other hubs and messaging systems to update their directory entries.

Additionally, a directory manager may be employed. The directory manager may initially push all directory entries and all directory updates for a given group of subscribers to a set of messaging systems. This provides the capability to ensure that all users of a small to mid-size company are in the cache directories of all systems servicing that company.

Accordingly, a communications system is provided that includes a receiving messaging system 202 or 215 connectable to a sending messaging system 210. The receiving messaging system 202 or 215 may receive a message addressed to a recipient and a time stamp 247 of a sending system directory entry 246 associated with the recipient from the sending messaging system 210. The sending system directory entry 246 may be used by the sending messaging system for a recipient confirmation. Recipient confirmation may be spoken name confirmation.

The receiving messaging system may include a time stamp of a receiving system directory entry associated with the recipient. The receiving messaging system may validate the recipient confirmation by comparing the time stamp of the receiving system directory entry to the time stamp of the sending system directory entry.

Although the present invention has been described in detail, it should be understood that various changes, alterations, and modifications may be made to the systems and methods described herein without departing from the spirit and scope of the present invention which is solely defined by the appended claims.

What is claimed is:

1. A communications system, comprising:

a receiving messaging system operable to receive from a sending messaging system a message addressed to a recipient and a time stamp of a sending system directory entry associated with the recipient, the sending system directory entry used by the sending messaging system for a recipient confirmation;

the receiving messaging system including a time stamp of a receiving system directory entry associated with the recipient; and the receiving messaging system operable to validate the recipient confirmation by comparing the time stamp of the receiving system directory entry to the time stamp of the sending system directory entry.

2. The communications system of claim 1, further comprising the receiving messaging system operable to return a message having an invalid recipient confirmation to the sending messaging system.

3. The communications system of claim 1, further comprising the receiving messaging system operable to deliver a message having a valid recipient confirmation to the recipient.

4. The communications system of claim 1, further comprising the sending messaging system operable to delete a sending system directory entry used by the sending messaging system for an invalid recipient confirmation.

5. The communications system of claim 1, the time stamp of the receiving system directory entry comprising an update time stamp of the receiving system directory entry.

6. The communications system of claim 1, the time stamp of the receiving system directory entry comprising a creation time stamp of the receiving system directory entry.

7. A communications system, comprising:

a network hub operable to be connected to a sending messaging system;

the network hub operable to receive from a sending messaging system a message addressed to a recipient and a time stamp of a sending system directory entry associated with the recipient, the sending system directory entry used by the sending messaging system for a recipient confirmation;

the network hub including a time stamp of a hub directory entry associated with the recipient; and the network hub operable to validate the recipient confirmation by comparing the time stamp of the hub directory entry to the time stamp of the sending system directory entry.

8. The communications system of claim 7, further comprising the network hub operable to return a message having an invalid recipient confirmation to the sending messaging system.

9. The communications system of claim 7, further comprising the network hub operable to deliver a message having a valid recipient confirmation to the recipient.

10. The communications system of claim 7, further comprising the sending messaging system operable to delete a sending system directory entry used by the sending messaging system for an invalid recipient confirmation.

11. The communications system of claim 7, the time stamp of the hub directory entry comprising an update time stamp of the hub directory entry.

12. The communications system of claim 7, the time stamp of the hub directory entry comprising a creation time stamp of the hub directory entry.

13. The communications system of claim 7, further comprising:

a second network hub in communication with the network hub;

the network hub operable to transmit a recipient message having a valid recipient confirmation to the second network hub;

the second network hub operable to receive from the network hub the message having the valid recipient confirmation and the time stamp of the hub directory entry associated with the recipient;

the second network hub including a time stamp of a second hub directory entry associated with the recipient; and the second network hub operable to further validate the recipient confirmation by comparing the time stamp of the second hub directory entry to the time stamp of the hub directory entry.

14. The communications system of claim 13, further comprising the second network hub operable to return a message having an invalid recipient confirmation to the sending messaging system.

15. The communications system of claim 13, further comprising the second network hub operable to deliver a message having a valid recipient confirmation to the recipient.

16. The communications system of claim 13, further comprising the network hub operable to delete a hub directory entry used by the network hub for an invalid recipient confirmation validation.

17. The communications system of claim 13, the time stamp of the hub directory entry comprising a creation time stamp of the hub directory entry and the time stamp of the second hub directory entry comprising a creation time stamp of the second hub directory entry.

18. A communications system, comprising:

a network hub operable to be connected to a sending messaging system;

the network hub operable to receive from the sending messaging system a message addressed to a recipient and an update time stamp of a sending system directory entry associated with the recipient, the sending system directory entry used by the sending messaging system for a recipient confirmation;

the network hub including an update and a creation time stamp of a hub directory entry associated with the recipient; and the network hub operable to validate the recipient confirmation by comparing the creation time stamp of the hub directory entry to the update time stamp of the sending system directory entry; and the network hub operable to determine an update status of the sending system directory entry by comparing the update time stamp of the hub directory entry to the update time stamp of the sending system directory entry.

19. The communications system of claim 18, further comprising the network hub operable to return a message having an invalid recipient confirmation to the sending messaging system.

20. The communications system of claim 18, further comprising the network hub operable to deliver a message having a valid recipient confirmation to the recipient.

21. The communications system of claim 18, further comprising the sending messaging system operable to delete a sending system directory entry used by the sending messaging system for an invalid recipient confirmation.

22. The communications system of claim 18, further comprising the sending messaging system operable to update a sending system directory entry used by the sending messaging system for an outdated recipient confirmation.

23. The communications system of claim 18, further comprising:

a second network hub in communication with the network hub;

the network hub operable to transmit a recipient message having a valid recipient confirmation to the second network hub;

the second network hub operable to receive from the network hub the message having the valid recipient confirmation and the update time stamp of the hub directory entry associated with the recipient;

the second network hub including an update and a creation time stamp of a second hub directory entry associated with the recipient;

the second network hub operable to further validate the recipient confirmation by comparing the creation time stamp of the second hub directory entry to the update time stamp of the hub directory entry; and the second network hub operable to determine an update status of the hub directory entry by comparing the update time stamp of the second hub directory entry to the update time stamp of the hub directory entry.

24. The communications system of claim 23, further comprising the second network hub operable to return a message having an invalid recipient confirmation to the network hub.

25. The communications system of claim 23, further comprising the second network hub operable to deliver a message having a valid recipient confirmation to the recipient.

26. The communications system of claim 23, further comprising the network hub operable to delete a hub directory entry used by the network hub for an invalid recipient confirmation validation.

27. The communications system of claim 23, further comprising the network hub operable to update a hub directory entry used by the network hub for an outdated recipient confirmation.

28. A communications system, comprising:

a sending messaging system including a sending system directory, the sending system directory including a sending system directory entry associated with a recipient and a time stamp of the sending system directory entry;

the sending messaging system operable to receive a message addressed to the recipient and to provide a recipient confirmation with the sending system directory entry;

a network hub in communication with the sending messaging system, the network hub including a hub directory, the hub directory including a hub directory entry associated with the recipient and a time stamp of the hub directory entry;

the network hub operable to receive from the sending messaging system the message addressed to the recipient and the time stamp of the sending system directory entry associated with the recipient; and the network hub operable to validate the recipient confirmation by comparing the time stamp of the hub directory entry to the time stamp of the sending system directory entry.

29. The communications system of claim 28, further comprising the network hub operable to return a message having an invalid recipient confirmation to the sending messaging system.

30. The communications system of claim 28, further comprising:

a receiving messaging system in communication with the network hub;

the network hub operable to transmit a recipient message having a valid recipient confirmation to the receiving messaging system;

the receiving messaging system operable to receive from the network hub the message having the valid recipient confirmation and the time stamp of the hub directory entry associated with the recipient;

the receiving messaging system including a receiving system directory, the receiving system directory including a receiving system directory entry associated with the recipient and a time stamp of the receiving system directory entry; and the receiving messaging system operable to further validate the recipient confirmation by comparing the time stamp of the receiving system directory entry to the time stamp of the hub directory entry.

31. The communications system of claim 30, further comprising the receiving messaging system operable to deliver a message having a valid recipient confirmation to the recipient.

32. A communications system, comprising:

a network hub operable to be connected to a sending messaging system;

the network hub operable to receive from a sending messaging system a message addressed to a recipient, a reply address of a sender of the message, and a time stamp of the message;

the network hub operable to deliver the message to a receiving messaging system along with the reply address of the sender of the message and the time stamp of the message;

the network hub operable to receive from the receiving messaging system a reply addressed to the reply address of the sender of the message and the time stamp of the message;

the network hub including a time stamp of a hub directory entry associated with the sender; and the network hub operable to validate the reply address of the sender by comparing the time stamp of the hub directory entry associated with the sender to the time stamp of the message.

33. The communications system of claim 32, further comprising the network hub operable to return a reply addressed to an invalid reply address to the receiving messaging system.

34. The communications system of claim 32, further comprising the network hub operable to deliver a reply addressed to an valid reply address to the sending messaging system.

35. The communications system of claim 32, further comprising:

the network hub operable to receive from the sending messaging system a time stamp of a sending system directory entry associated with the recipient, the sending system directory entry used by the sending messaging system for a recipient confirmation;

the network hub including a time stamp of a hub directory entry associated with the recipient;

the network hub operable to validate the recipient confirmation by comparing the time stamp of the hub directory entry to the time stamp of the sending system directory entry; and the network hub operable to deliver a message having a valid recipient confirmation to the receiving messaging system.

36. A method of validating messages using a communications network, comprising the steps of:

receiving at a receiving messaging system a message addressed to a recipient and a time stamp of a sending system directory entry associated with the recipient, the sending system directory entry used by a sending messaging system for a recipient confirmation;

getting from the receiving messaging system a time stamp of a receiving system directory entry associated with the recipient; and validating the recipient confirmation by comparing the time stamp of the receiving system directory entry to the time stamp of the sending system directory entry.

37. The method of claim 36, further comprising the step of returning a message having an invalid recipient confirmation to the sending messaging system.

38. The method of claim 36, further comprising the step of delivering a message having a valid recipient confirmation to the recipient.

39. The method of claim 36, further comprising the step of deleting a sending system directory entry used by the sending messaging system for an invalid recipient confirmation.

40. The method of claim 36, further comprising the steps of:

getting from the receiving messaging system an update time stamp of the receiving system directory entry associated with the recipient; and determining an update status of the sending system directory entry associated with the recipient by comparing the update time stamp of the receiving system directory entry to the time stamp of the sending system directory entry.

41. A method of validating messages using a communications network, comprising the steps of:

receiving at a network hub a message addressed to a recipient, a reply address of a sender of the message, a time stamp of the message, and a time stamp of a sending system directory entry associated with the recipient, the time stamp of the sending system directory entry used by the sending messaging system for a recipient confirmation;

getting from the network hub a time stamp of a hub directory entry associated with the recipient;

validating the recipient confirmation by comparing the time stamp of the hub directory entry to the time stamp of the sending system directory entry;

delivering a message having a valid recipient confirmation to a receiving messaging system along with the reply address of the sender of the message and the time stamp of the message;

receiving from the receiving messaging system a reply addressed to the reply address of the sender of the message and the time stamp of the message;

getting from the network hub a time stamp of a hub directory entry associated with the sender; and validating the reply address of the sender by comparing the time stamp of the hub directory entry associated with the sender to the time stamp of the message.

* * * * *